US011898705B2

(12) United States Patent
Solomon et al.

(10) Patent No.: US 11,898,705 B2
(45) Date of Patent: Feb. 13, 2024

(54) SYSTEM AND METHOD FOR MECHANICAL FAILURE CLASSIFICATION, CONDITION ASSESSMENT AND REMEDIATION RECOMMENDATION

(71) Applicant: Aquarius Spectrum Ltd., Netanya (IL)

(72) Inventors: David Solomon, Zikhron Ya'acov (IL); Bori Solomon, Zoran (IL)

(73) Assignee: Aquarius Spectrum Ltd., Netanya (IL)

( * ) Notice: Subject to any disclaimer, the term of this patent is extended or adjusted under 35 U.S.C. 154(b) by 163 days.

(21) Appl. No.: 17/286,405

(22) PCT Filed: Oct. 17, 2019

(86) PCT No.: PCT/IB2019/058882
§ 371 (c)(1),
(2) Date: Apr. 16, 2021

(87) PCT Pub. No.: WO2020/079650
PCT Pub. Date: Apr. 23, 2020

(65) Prior Publication Data
US 2021/0388950 A1     Dec. 16, 2021

Related U.S. Application Data

(63) Continuation-in-part of application No. 16/163,598, filed on Oct. 18, 2018, now Pat. No. 10,948,377.

(51) Int. Cl.
*F17D 5/00*     (2006.01)
*G01M 3/28*     (2006.01)
(Continued)

(52) U.S. Cl.
CPC ............... *F17D 5/06* (2013.01); *E03B 7/003* (2013.01); *G01M 3/243* (2013.01); *G01M 3/2815* (2013.01)

(58) Field of Classification Search
CPC .... G01M 3/00; G01M 3/24–28; G01M 3/243; G01M 3/2815; E03B 7/00; E03B 7/003; F17D 5/00–06
See application file for complete search history.

(56) References Cited

U.S. PATENT DOCUMENTS

| 5,918,271 A | 6/1999 | Mcguigan |
| 7,920,983 B1 | 4/2011 | Peleg et al. |

(Continued)

FOREIGN PATENT DOCUMENTS

| CN | 111765389 A | * | 10/2020 | ............... F17D 5/00 |
| DE | 44 15 582 A1 | | 11/1995 | |

(Continued)

OTHER PUBLICATIONS

International Search Report dated Mar. 12, 2020 in PCT/IB19/58882 (3 pages).

(Continued)

*Primary Examiner* — Nguyen Q. Ha
(74) *Attorney, Agent, or Firm* — 24IP Law Group USA, PLLC; Timothy R DeWitt

(57) ABSTRACT

A system for pipe network failure classification, may include one or more sensors, a pipe network parts database, and at least one processor communicatively networked to the one or more sensors and the pipe network parts database. The at least one processor is configured to intermittently receive sensor collected parameters from the one or more sensors, reference, upon receipt of an indication of a failure of a pipe in the pipe network, records of the pipe network parts database and retrieve one or more feature parameter values associated with the failed pipe's operational or environmental conditions, and classify the pipe failure into one of two or more failure categories associated with different failure causes, based on values of parameters associated with the (Continued)

failed pipe that are received from at least one of the one or more sensors or the pipe network parts database.

45 Claims, 22 Drawing Sheets

(51) Int. Cl.
  *F17D 5/06* (2006.01)
  *G01M 3/24* (2006.01)
  *E03B 7/00* (2006.01)

(56) References Cited

U.S. PATENT DOCUMENTS

| | | | |
|---|---|---|---|
| 11,015,998 B2* | 5/2021 | Soda | G01M 3/002 |
| 2003/0171879 A1 | 9/2003 | Pittalwala et al. | |
| 2011/0292384 A1 | 12/2011 | Ramos et al. | |
| 2015/0211673 A1 | 7/2015 | Jan et al. | |
| 2016/0252422 A1 | 9/2016 | Howitt | |
| 2017/0227596 A1 | 8/2017 | Sozer et al. | |
| 2018/0217023 A1* | 8/2018 | Hansen | G01M 3/246 |
| 2020/0103306 A1* | 4/2020 | Mine | G01M 3/007 |
| 2020/0191316 A1 | 6/2020 | Du | |

FOREIGN PATENT DOCUMENTS

| | | |
|---|---|---|
| JP | 2011-017823 A | 1/2011 |
| JP | 5143111 B2 | 2/2013 |
| WO | WO-2014/115039 A2 | 7/2014 |

OTHER PUBLICATIONS

Notice of Allowance on U.S. Appl. No. 16/163,598 dated Nov. 12, 2020.

Extended European Search Report on EP19872585.5, dated Jun. 30, 2022.

* cited by examiner

SYSTEM AND METHOD FOR MECHANICAL FAILURE CLASSIFICATION, CONDITION ASSESSMENT AND REMEDIATION RECOMMENDATION

CROSS-REFERENCE TO RELATED APPLICATIONS

The present application claims priority under 37 U.S.C. § 371 to International Patent Application No. PCT/IB2019/058882, filed Oct. 17, 2019, which claims priority to and the benefit of U.S. patent application Ser. No. 16/163,598, filed on Oct. 18, 2018. The contents of these applications are hereby incorporated by reference in their entireties. application claims benefit of U.S. application Ser. No. 16/163, 598, filed Oct. 18, 2018, the entire contents of which are hereby incorporated by reference.

TECHNICAL FIELD

The present embodiments relate generally to the field of system monitoring. More specifically, the present embodiments relate to a system and method for mechanical failure classification, condition assessment, and remediation recommendation.

BACKGROUND

The field of system monitoring, particularly for pipe networks, is important to minimize damage to people and the environment in the case of a leak. For these reasons, many countries have enacted international standards for monitoring systems, requiring a level of sensitivity, reliability, accuracy, and robustness. There exist several types of monitoring systems in the current market, splitting into two main categories: continuous and non-continuous monitoring systems. Non-continuous systems are slowly being replaced by continuous systems, as continuous systems can provide more extensive feedback and information about the status of the pipe network.

SUMMARY

The present embodiments relate to systems and methods for mechanical failure classification, condition assessment, and remediation recommendation in pipe networks. Additionally, embodiments herein include a system for mechanical condition assessment for generating failure and maintenance remediation recommendations based at least partially on: (a) operational and environmental conditions; (b) databases including records relating to characteristics of the failed part; (c) a classification of the detected failure; and (d) predictive statistical analysis to determine potential for future failure of a part.

In some of the following discussions, mechanical failures classification and remediation and operation conditions assessment, are described in the context of a water supply pipe network. This is not the limit the scope of the teachings herein and their applicability for the operation monitoring and support of various mechanical systems, such as but not limited to, fluid supply or disposal systems.

According to certain aspects, embodiments provide a system for pipe network failure classification may include one or more sensors, a pipe network parts database, and at least one processor. The one or more sensors may be deployed in, on or in proximity to at least one pipe of a pipe network, for monitoring a pipe operation condition and collecting related parameter values. The pipe network parts database may store feature parameter value records of pipes in the pipe network. The at least one processor may be communicatively networked to the one or more sensors and the pipe network parts database. The at least one processor may be configured to intermittently receive sensor collected parameters from the one or more sensors, reference, upon receipt of an indication of a failure of a pipe in the pipe network, records of the pipe network parts database and retrieve one or more feature parameter values associated with the failed pipe's operational or environmental conditions, and classify the pipe failure into one of two or more failure categories associated with different failure causes, based on values of parameters associated with the failed pipe that are received from at least one of the one or more sensors or the pipe network parts database.

According to other aspects, embodiments provide a method for pipe network failure classification, may include monitoring operation conditions of at least one pipe of a pipe network and logging operation related parameter values collected by one or more sensors deployed in, on or in proximity to the at least one pipe of the pipe network. The method may include monitoring environment conditions of the at least one pipe of the pipe network and collecting related parameter values. The method may include intermittently receiving network part environment parameter values. The method may include receiving an indication of a pipe failure in the pipe network or learning of a pipe failure in the pipe network by accessing a pipe network failures database that stores records of operation related parameter values collected by the one or more sensors, and finding an indication of a pipe failure therein. The method may include referencing records of a pipe network parts database that stores feature parameter value records of pipes in the pipe network. The method may include retrieving one or more feature parameter values associated with a failed pipe. The method may include classifying the pipe failure into one of two or more failure categories associated with different failure causes, based on at least one collected value of operation parameters of the failed pipe, one collected value of environment parameters of the failed pipe and one retrieved value from the feature parameter value records of the pipe network parts database.

According to certain aspects, embodiments provide a system for pipe condition assessment. The system may include at least one sensor installed on a pipe for monitoring operations of the pipe. The system may further include a processor configured to analyze data output from the sensor. The processor may be further configured to extract features related to operations of the pipe based on the analysis of the sensor data.

The at least one sensor may include at least one of acoustic sensor or water meter. The processor may be further configured to detect leaks based on data output from the at least one of acoustic sensor or water meter, and estimate leak intensity and leak growth rate of the detected leaks.

The at least one sensor may include a pressure sensor. The processor may be further configured to detect, based on data output from the pressure sensor, pressure changes and pressure surges, and correlate the detected pressure changes and pressure surges with appearance and growth of leaks.

The at least one sensor may include a pressure sensor. The processor may be further configured to calculate, based on data output from the pressure sensor, pressure stress exerted on a section of the pipe, and perform a condition assessment of the pipe based on the calculated pressure stress.

According to other aspects, embodiments provide a method for pipe condition assessment in a system that may include a processor and at least one sensor installed on a pipe for monitoring operations of the pipe. The method may include analyzing data output from the sensor at the processor and extracting sensor data features related to operations of the pipe based on the analyzed data. The method may further include classifying failure modes at the processor according to classification features that may include the sensor data features. The method may further include providing recommendations by the processor based on a classification result. The method may further include assessing a condition of pipe segments with similar operational conditions by the processor based on classification features.

The at least one sensor may include at least one of acoustic sensor or water meter. The method may further include detecting leaks based on data output from the at least one of acoustic sensor or water meter, and estimating leak intensity and leak growth rate of the detected leaks.

The at least one sensor may include a pressure sensor. The method may further include detecting, based on data output from the pressure sensor, pressure changes and pressure surges, and correlating the detected pressure changes and pressure surges with appearance and growth of leaks.

The at least one sensor may include a pressure sensor. The method may further include calculating, based on data output from the pressure sensor, pressure stress exerted on a section of the pipe, and performing a condition assessment of the pipe based on the calculated pressure stress.

According to other aspects, embodiments provide a method of pipe condition assessment in a system that may include a processor and at least one sensor installed on a pipe. The method may include measuring leak data relating to a leak of the pipe by the sensor. The method may further include estimating leak intensity of a pipe section by the processor based on the measured leak data. The method may further include assessing a condition of the pipe section by the processor based on the estimated leak intensity.

The method may further include estimating, by the processor, a plurality of values of leak intensity for a period of time, calculating, by the processor based on the plurality of values of leak intensity, a growth rate of the leak of the pipe, and assessing, by the processor based on the calculated leak growth rate, condition of the pipe.

The at least one sensor may include two acoustic sensors. The estimating leak intensity of the pipe section may include installing the two acoustic sensors in proximity to the pipe section such that a distance between two acoustic sensors is a predetermined distance, calculating an acoustic power by the two acoustic sensor, and calculating the leak intensity of the pipe section based on the acoustic power.

The calculating an acoustic power may include measuring, by the two acoustic sensors, correlation and attenuation of acoustic signals in the pipe, and calculating, by the two acoustic sensors, the acoustic power based on the measured correlation and attenuation of acoustic signals.

The at least one sensor may further include a pressure sensor. The method may further include measuring, by the pressure sensor, a differential pressure representing a difference between a water pressure in the pipe and a pressure outside the pipe, and calculating a leak flow of the pipe section based on the acoustic power and the differential pressure.

The method may further include measuring, by the at least one sensor, pressure transients in the pipe, estimating, by the processor, changes in pipe wall strength of the pipe, and assessing, by the processor, condition of the pipe section based on at least one of the estimated leak intensity or the estimated changes in pipe wall strength. The pressure transients may include localized wave fronts that travel through the pipe.

The method may further include analyzing, by the processor, reflection of the pressure transients by changes in wall thickness and elastic modulus, and estimating, by the processor based on a result of the analysis, the changes in pipe wall strength.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

Figure 1A:
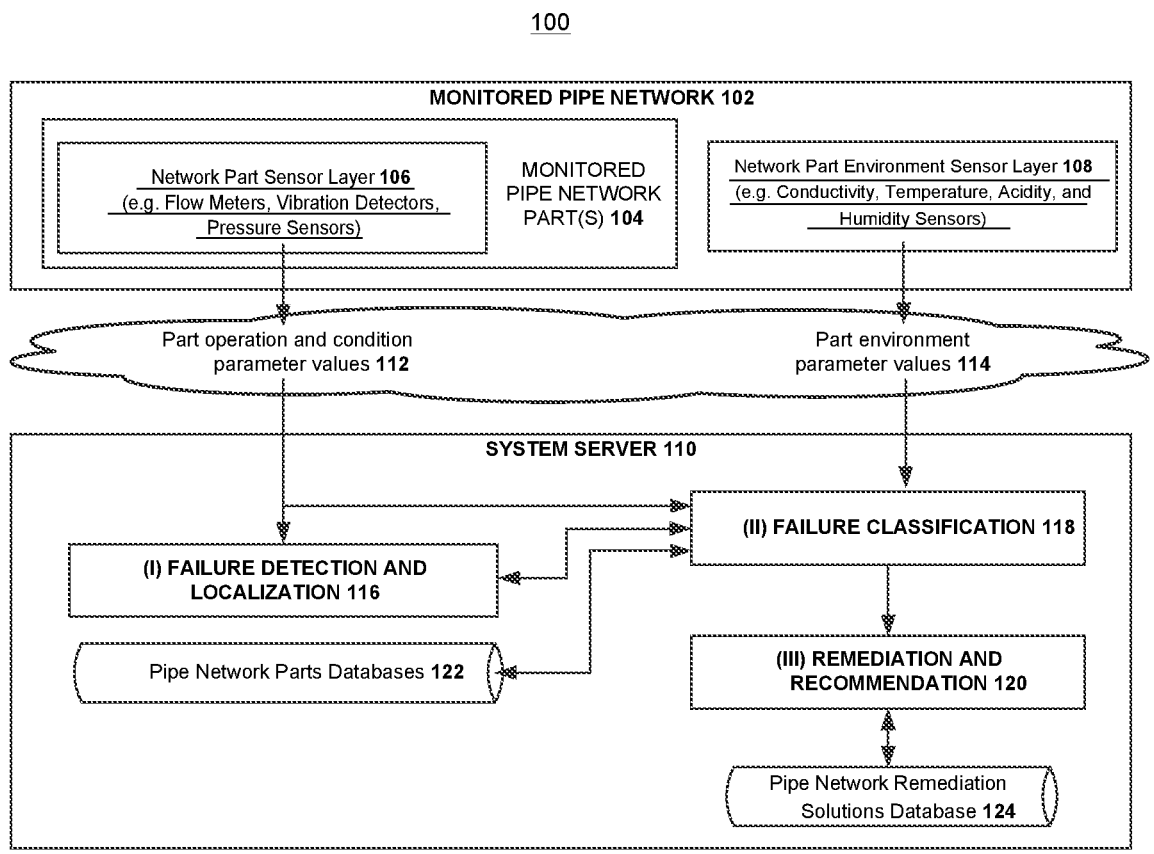
FIG. 1A is a block diagram illustrating an exemplary system for mechanical failure detection and classification according to some embodiments, which can detect and classify leaks in a pipe network and provide a remediation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

According to certain aspects, embodiments in the present disclosure relate to techniques for systems and methods for mechanical failure classification, condition assessment, and remediation recommendation in pipe networks. Additionally, embodiments herein include a system for mechanical condition assessment for generating failure and maintenance remediation recommendations based at least partially on: (a) operational and environmental condition information of, and surrounding, the part which failed, provided from sensors; (b) databases including records relating to characteristics of the failed part, records of prior events or failures relating to the failed part, records relating to prior maintenance or remediation tasks performed on failed part and/or records relating to a future maintenance or remediation tasks scheduled to be performed on failed part; (c) a classification of the detected failure; and (d) predictive statistical analysis using database records to determine potential for future failure of a part.

The presence of a leak represents a loss of resources as well as an economic loss. In some cases, for example, when the fluid is a toxic or combustible material, the presence of a leak can create a dangerous situation.

Leaks can be detected in two general ways. The first is by detecting the substance that escapes the vessel. The second is by detecting certain leak-related properties such as pressure drops, acoustic emissions, volume balance changes and temperature changes.

Furthermore, determining required maintenance based on current pipe network conditions requires operators to perform an inline inspection of pipes to view potential areas of corrosion, mechanical stress, or other factors that may cause leaks in the near future. This method is very expensive and requires special access to the pipe.

According to certain aspects, embodiments in the present disclosure relate to techniques in the field of system monitoring for systems and methods directed to mechanical failure classification, condition assessment and remediation recommendation. These techniques are directed to detecting and classifying mechanical failures, such as those that may occur in a pipe network, and wherein the classification may be utilized for the recommendation of remediation to the mechanical failure and for prevention of similar conditions.

Further solutions according to embodiments in the present disclosure relate to techniques in the field of system monitoring and modeling for systems and methods directed to pipe condition assessment and optimal maintenance recommendations. These techniques are directed to a model-based approach for pipe condition assessment and optimal maintenance recommendation for pipe network parts based upon previously detected and classified mechanical failures. The generated model may be utilized to predict the probability of failure based on multiple parameters of the pipe network part.

In a further embodiment, the present disclosure presents a solution related techniques in the field of continuous system monitoring for a system and method for pipe condition assessment and pipe failure classification. These techniques are directed to detecting and classifying pipe strength based on leak development dynamics. These techniques are further directed to a method for simulating detectable acoustic reflections to detect variations in pipe wall thickness and elastic modulus.

In some of the following discussions, mechanical failures classification and remediation and operation conditions assessment, are described in the context of a water supply pipe network. This is not the limit the scope of the teachings herein and their applicability for the operation monitoring and support of various mechanical systems, such as but not limited to, fluid supply or disposal systems.

According to certain aspects, embodiments provide a system for pipe condition assessment. The system may include at least one sensor installed on a pipe for monitoring operations of the pipe. The system may further include a processor configured to analyze data output from the sensor. The processor may be further configured to extract features related to operations of the pipe based on the analysis of the sensor data.

According to other aspects, embodiments provide a method for pipe condition assessment in a system that may include a processor and at least one sensor installed on a pipe for monitoring operations of the pipe. The method may include analyzing data output from the sensor at the processor and extracting sensor data features related to operations of the pipe based on the analyzed data. The method may further include classifying failure modes at the processor according to classification features that may include the sensor data features. The method may further include providing recommendations by the processor based on a classification result. The method may further include assessing a condition of pipe segments with similar operational conditions by the processor based on classification features.

According to other aspects, embodiments provide a method of pipe condition assessment in a system that may include a processor and at least one sensor installed on a pipe. The method may include measuring leak data relating to a leak of the pipe by the sensor. The method may further include estimating leak intensity of a pipe section by the processor based on the measured leak data. The method may further include assessing a condition of the pipe section by the processor based on the estimated leak intensity.

According to some embodiments, there may be provided a part sensor layer including one or more part sensors and signal processing circuits to receive and process signals generated by the one or more part sensors and indicative of part operation condition and/or failure. There may also be provided a part environment sensor layer including one or more part associated environmental sensors and signal processing circuits to receive and process signals generated by the one or more part environment sensors located on or around a respective. The sensors may, for example, include vibration sensors, acoustic sensors, accelerometers, hydrophones, microphones, pressure sensors, strain sensors, stress sensors, compression sensors, deflection sensors, temperature sensors and/or location sensors.

According to some embodiments, one or more part sensors signals, other part operation monitoring components (e.g. flow meters) and/or database records relating to characteristics of the monitored part(s), may indicate of a part operation failure. Signals measured by part sensors and/or signals from other monitoring/metering components including one or more operation and condition parameter values, may be recorded/logged to a database and intermittently compared, by a failure detection logic, to predefined or dynamically generated operation conditions parameter schemes and/or value combinations—associated with part failure scenarios.

According to some embodiments, part sensors signals may indicate of part operation, condition and/or failure. One or more operation and condition parameter values, measured by the part sensors layer over time, may be recorded/logged to a database and intermittently compared, by a failure classification logic, to predefined or dynamically generated operation conditions parameter schemes and/or value combinations—associated with corresponding classes of parts and part failure scenarios.

Based on one or more part failure scenarios matched thereto, a given operation failure may be classified into two or more possible failure types or categories, wherein each failure type or category may be associated with a set of one or more potential causes and/or sources thereof.

According to some embodiments, failure associated operation conditions parameter schemes and/or value combinations may include threshold values for: (1) pipe network part related leak intensity and leak intensity change rate, based on vibration/acoustic sensors and/or pipe network flow meters; (2) pipe network part related pressure and pressure transients, based on pressure sensors; (3) database stored, pipe network part features, characteristics and/or specification records; (4) pipe network part environmental conditions, based on part environment sensors; (5) database stored, pipe failure history records; and/or others.

According to some embodiments, failure classification types or categories, associated with operation conditions parameter schemes and/or value combinations, may for example include: (1) part/pipe burst due to material degradation, (2) part/pipe burst due to ground movement, (3) part/pipe burst due to frost or other weather factors, (4) part/pipe corrosion due to stray currents, (5) part/pipe corrosion due to corrosive ground, (6) part/pipe slow/fast developing crack, (7) par/pipe physical breakage/tearing and/or other.

According to some embodiments, potential failure causes and/or sources associated with a failure type or category may include: (1) external physical causes (e.g. humans, vehicles, machinery) (2) external weather and environment related causes (e.g. humidity—corrosion, rusting, electric current heat—melting), (3) internal operational causes (e.g. pipe network pressure, damaged part), (4) maintenance related causes (e.g. old pipes/parts/infrastructure), (5) typical material or part specific causes.

According to some embodiments, part environment sensors signals may indicate of part operation, condition and/or failure, as described above in regard to the part sensor signals. Part environment sensors signals may indicate of one or more environmental conditions on the outside of, in the proximity of and/or in the area(s) around the failed part(s). One or more environmental parameter values, measured by the part environment sensors layer over time, may be recorded/logged to a database and intermittently compared, by the failure classification logic, to predefined or dynamically generated environmental conditions parameter schemes and/or value combinations—associated with corresponding classes of parts and part failure scenarios.

Based on one or more part failure scenarios matched with the measured environmental parameter values in accordance with some embodiments, a given operation failure may be classified into two or more possible failure types or categories, wherein each failure type or category may be associated with a set of one or more potential causes and/or sources thereof.

According to some embodiments, sensor measured environmental conditions on the outside of, in the proximity of and/or in the area(s) around the failed part(s), may include: (1) temperature and temperature changes, (2) humidity levels, (3) vibration frequency/amplitude values, (4) pressure levels outside/around part, (5) light amounts, (6) electromagnetic radiation amounts, (7) wind speeds, (8) acidity levels, (9) noise levels and types, (10) ground type, (11) soil acidity levels, (12) electric current and/or other.

According to some embodiments, one or more remediation solutions, for preventing, terminating, slowing and/or fixing the part failure may be recommended, or automatically executed, based on the classification of a given part(s) operation failure.

According to some embodiments, the classification of the given part(s) operation failure may be used, by a remediation retrieval and recommendation logic, for referencing a remediation solutions database including remediation solutions records associated with respective part operation failure category cause(s) or source(s). Remediation solutions records in the database, matching the estimated cause(s) or source(s) of the given part(s) operation failure—as defined-by/associated-with the part failure's classification category, may be selected for recommendation and/or execution.

According to some embodiments, remediation solutions may include: alerting of related personal, triggering the operation of management/backup/emergency/repair/shutdown systems, relaying of requests for additional data from the system's part sensors and/or part environment sensors, communicating with 3rd party entities the are the cause/source of the failure or that act to stop it.

According to some embodiments, the classification of part(s) operation failures may be used, by a condition assessment logic, for assessing the operational condition of an entire monitored system or pipe network and the recommendation and prioritization of system/network maintenance/mediation tasks based thereof.

According to some embodiments, classes of part operation failures having high relevancy or urgency for remediation/repair may be defined. In each cluster of a monitored system/pipe-network; the number of actual part operation failures classified to one of the high relevancy or urgency defined classes, may be registered for each of the clusters. Maintenance and repair solutions may then be selected or generated for entire clusters and/or prioritized based on the number of relevant/urgent operation failure in each of the clusters.

According to some embodiments, classes of part operation failures may be used to generate a statistical failure probability model to predict potential failures. The model may be generated based on part failure history, part failure classification history, part maintenance history, or sensor data detailing part information or environment information. The model may be set to determine the probability of failure for a particular part or a group of parts in a pipe network. The model may use probability distributions and may implement the use of different characteristic parameters to fit the model.

According to some embodiments, methods for analyzing data to determine leak development dynamics may be used to detect and classify pipe strength and/or pipe condition. Leak development dynamics may be determined from continuous data collection from pressure sensors, acoustic sensors, and/or flow rates. A condition assessment logic may use leak development dynamics to generate a pipe condition assessment result detailing the strength or status of the pipe. The strength or status of the pipe may be characterized by measurements and/or changes in pipe wall thickness and elastic modulus.

Embodiments in the present disclosure have at least the following advantages and benefits.

Advantages of the embodiments described in the present disclosure include a system with continuous monitoring sensors that can provide measurements at any set time interval. In some embodiments, the system can determine an estimated leak intensity from acoustic and vibration sensors using a cross-correlation function, and further utilizing the cross-correlation function capable of detecting a leak and calculating the location from the time shift between signals. The intensity change can give information about the failure mechanism that caused the leak before a physical investigation must be made after the failure and potential emergency response has occurred. Furthermore, the classification of the failure can identify cases of systematic failure that can be characterized by operational and environmental factors such that future operations or other procedures can be changed or otherwise altered to prevent further failures of the same type.

Advantages of the embodiments described in the present disclosure further include the ability to predict potential failure of a pipe or section of a pipe based on statistical modeling developed from database history of failures and their respective classifications. This eliminates a need for an operator to perform an inline inspection of the pipe, and does not require special access to the pipe. The statistical model further grants the ability to track internal failures, external failures, failures due to erosion, etcetera all at the same time and takes each of these failure modes into account. The statistical model of failure probability can further contribute to the prevention of leaks by predicting a point at which maintenance is required to prevent a potential failure.

Advantages of the embodiments described in the present disclosure further included a system that utilizes continuous monitoring sensors to perform correlation measurements between sensors over pipe sections to determine acoustic intensity changes or pressure transients. The correlation measurements enable the monitoring system to detect leak development and track development dynamics to determine a pipe condition based on wall strength of a section of a pipe network. The correlation measurements further provide information that more precisely and accurately locates a leak based on pressure transient detection, eliminating a need to obtain access to large sections of the pipe to determine s precise leak location.

I. System and Method for Mechanical Failure Classification, Condition Assessment and Remediation Recommendation FIG. 1A is a block diagram illustrating an exemplary system 100 for mechanical failure detection and classification, which can detect and classify leaks in a pipe network and provide a remediation. System 100 can perform any of the methods described in the present disclosure.

Referring to FIG. 1A, in some embodiments, in a monitored pipe network 102 pipe network parts 104, for example, various pipes, sewers, culverts and/or others, are monitored by: (1) a pipe network part sensor layer 106, including one or more sensors positioned inside and/or on corresponding pipe network parts 104; and (2) a pipe network part environment sensor layer 108, including one or more sensors positioned around, in proximity to and/or at the vicinity of corresponding pipe network parts. In some embodiments, the part sensor layer 106 and the part environment sensor layer 108 each includes, or is functionally associated with: (1) signal processing circuits for pre-processing and/or digitizing, sensor outputted signals; (2) communication circuitry for communicating processed sensor signals to the system's server(s) and functional blocks thereof; (3) a power source (e.g. a rechargeable battery)—not shown; and (4) a processor for managing and coordinating the operation of the sensors, the signal processing circuits, the electric power consumption, the communication circuitry and/or other system components.

In some embodiments, part operation related parameter values 112 are sensed by the pipe network part sensor layer 106 and relayed to a failure detection and localization block 116. Failure detection and localization block 116 is implemented on the system's server(s) 110. The failure detection and localization block 116 analyzes the received sensor readings to indicate/notify/alert upon a sensors' parameter value 112, or values combination, associated with a pipe network failure such as a leak, occurring.

In some embodiments, the failure classification block 118, implemented on the system's server(s) 110, is notified by the failure detection and localization block 116 upon detection of a pipe network failure. Part operation related parameter values 112 and part environment related parameter values 114, sensed by the pipe network part sensor layer 106 and the pipe network part environment sensor layer 108, respectively, are relayed to the failure classification block 118. The failure classification block 118 analyzes: (1) the part operation related parameter values 112 collected by the failure classification block 118 prior to, during and/or following to, the received failure notification; (2) the part environment related parameter values 114 collected by the failure classification block 118 prior to, during and/or following to, the received failure notification; and/or (3) one or more parameter values, stored in a pipe network parts database 122 that are indicative of parts-related events and failure history characteristics, and/or maintenance actions to be performed on a part in the pipe network 102.

In some embodiments, the failure classification block 118 may classify the pipe network part(s) failure which triggered the notification by the system's detection and localization block 116 based on the received notification, the received/logged/referenced part and part environment data, and/or the pipe network parts 104 database records. The classification may be established at least partially based on: (1) the received notification, the place in the pipe network 102 where it occurred and/or the time of day/year in which it occurred; (2) the operational conditions of the failing part(s); (3) the environmental conditions around, in proximity to and/or at the vicinity of the failure; and/or (4) characteristics or maintenance data that may indicate or negate specific parts failures and/or may increase/decrease the likelihood of their occurrence within the specific circumstances.

In some embodiments, the remediation and recommendation block 120, based on the received failure classification, may suggest and/or trigger one or more means or measures to halt, slow down, lower the impact of and/or prevent future occurrence, of the estimated failure. The remediation and recommendation block 120 may reference a pipe network remediation solutions database 124, querying the database with the part failure's classification data. Respective solutions matching the failure class used to query the database may be triggered by the remediation and recommendation block 120. Remediation solutions may, for example, take the form of: (1) generating recommendations for parts/infrastructure repair or replacement; (2) alerting or notifying failure to failed-part related personal or systems, optionally with an action recommendation; and/or (3) automatically initiating, terminating and/or changing the operation of one or more failure associated systems.

Figure 1B:
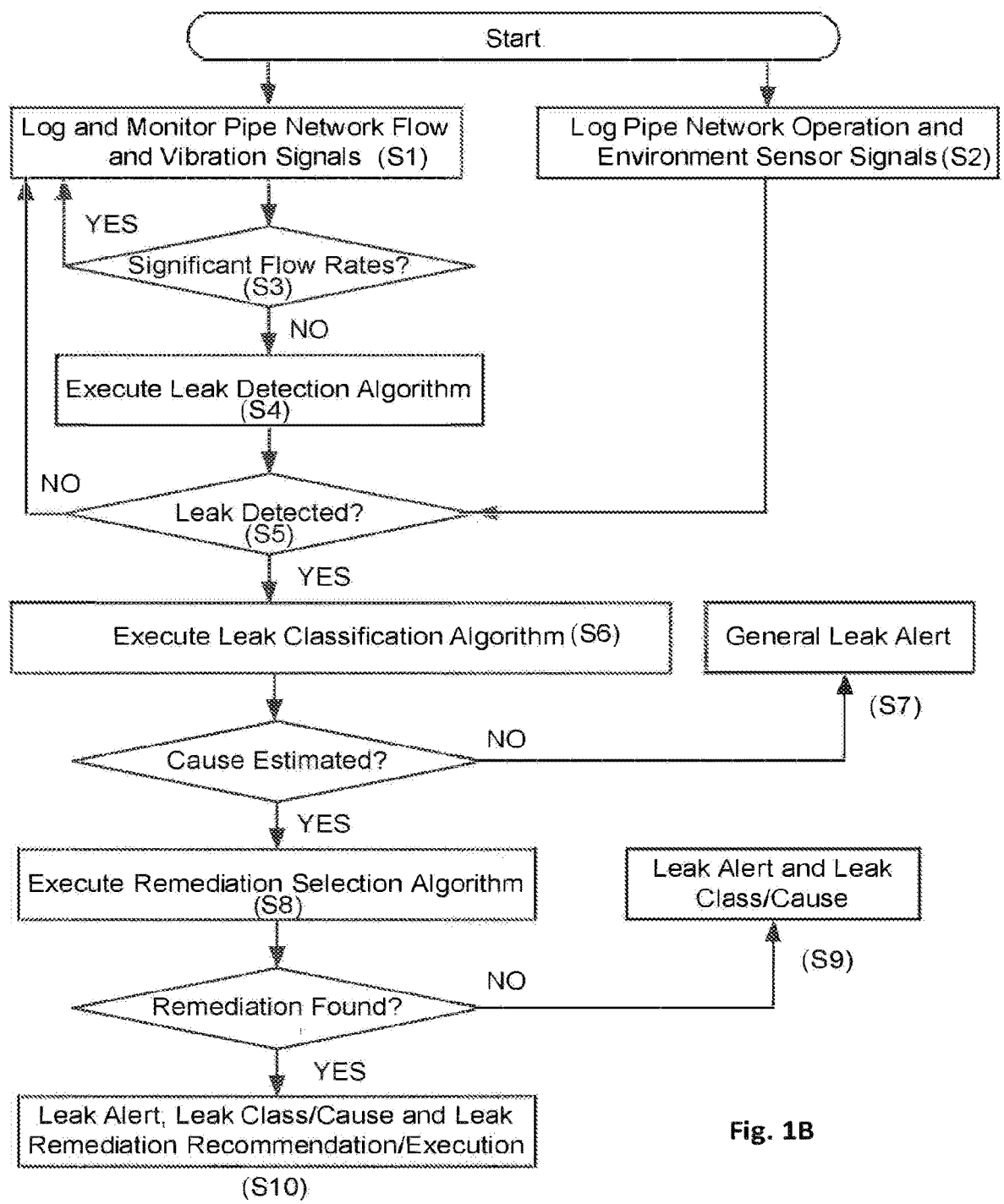
FIG. 1B is a flowchart illustrating an exemplary process for mechanical failure detection and classification in a pipe network according to some embodiments.

FIG. 1B illustrates a flowchart depicting an exemplary process of the main steps executed as part of a process for mechanical failure (leak) detection and classification in a pipe network 102 in accordance with some embodiments of the present disclosure. In some embodiments, the process may include: logging and monitoring pipe network flow and vibration signals (S1); logging and monitoring pipe network operation and environment sensor signals (S2); if significant flow rates in the pipe network remain substantially constant, go back to step 1 (S3); else executing a leak detection algorithm (S4); if the algorithm did not detect a leak, returning to step 1 (S5); else executing a leak classification algorithm (S6); if the algorithm did not classify the failure, issuing a general leak alert (S7); else executing a remediation selection algorithm (S8); if the algorithm did not find a remediation to the failure based on the classification, issuing a leak alert with the class of the leak (S9); else issuing a leak alert with the estimated class of the leak and a remediation recommendation and/or automatically initiate remediation steps/actions (S10).

Figure 2A:
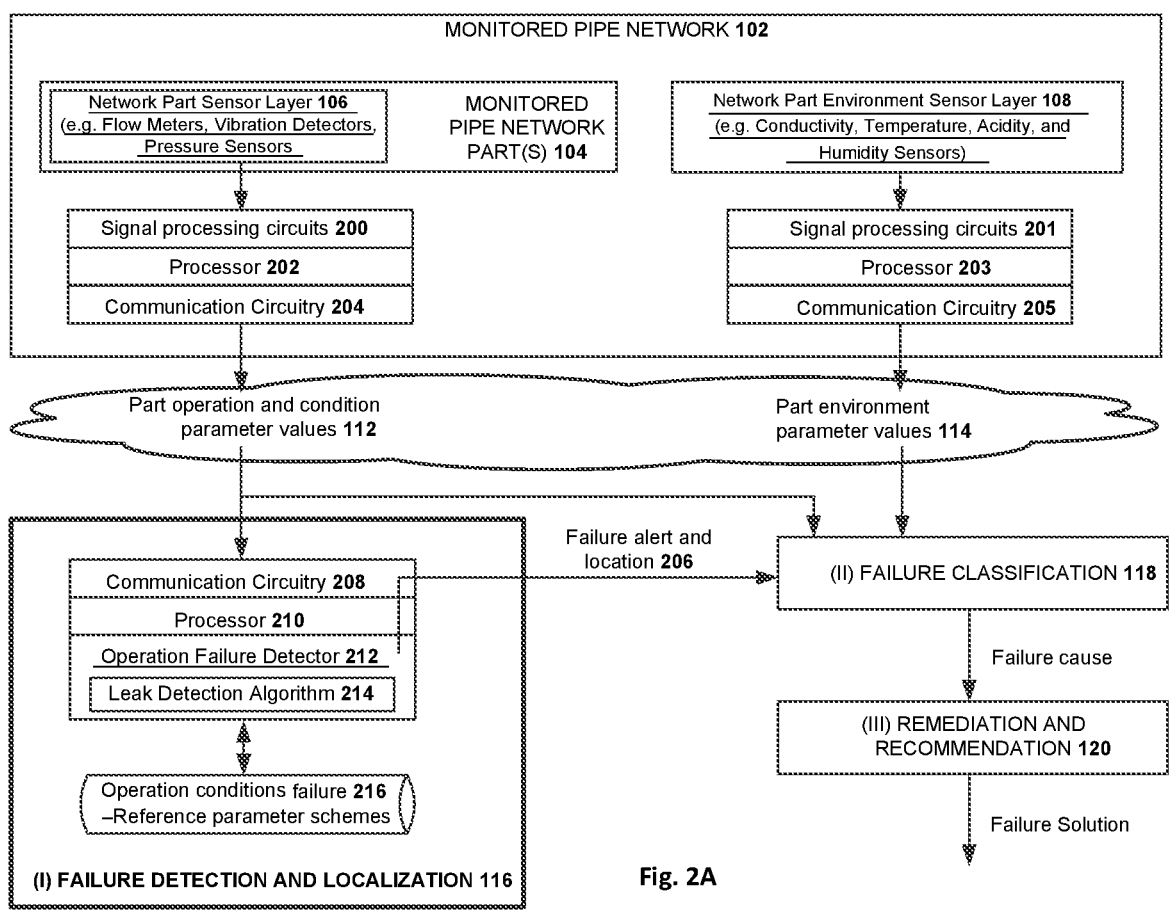
FIG. 2A is a block diagram illustrating an exemplary system for mechanical failure detection and classification according to some embodiments, in which the system's failure detection and localization block is shown in further detail.

In FIG. 2A, there is shown, in accordance with some embodiments, a block diagram illustrating an exemplary system 100 for mechanical failure detection and classification, wherein the system's failure detection and localization block 116 is shown in further detail. In some embodiments, the monitored pipe network 102 may include signal processing circuits 200 and 201. Signal processing circuit 200 may interface with network part sensor layer 106 and its respective processor 202. Signal processing circuit 201 interfaces between network part environment sensor layer 108 and processor 203. Processors 202 and 203 use communication circuitry 204 and 205, respectively, to communicate with each other, and with the failure detection and localization block 116, the failure classification block 118, and the remediation and recommendation block 120, or any combination of the three. Processors 202 and 203 may be separate processors with separate communication and signal processing circuits, or they may be combined into one processor with a signal processing circuit and a communication circuit.

In some embodiments, the failure detection and localization block is shown to include: (1) communication circuitry 208 for intermittently receiving parameter values measured by the sensors of the network part sensor layer 106 and/or relaying corresponding receipt acknowledgments to/from communication circuitry 204 or 205; (2) an operation failure detector 212 (also referred to herein, as failure detection logic) for analyzing the parameter values received from the part sensors and determining whether they indicate a possible pipe network part(s) failure; and (3) a processor 210 for managing the operation of the communication circuitry, the failure detector and/or other system components.

In some embodiments, the operation failure detector 212 may execute a leak detection algorithm 214 for determining a part failure, by referencing the 'operation conditions failure—reference parameters schemes' database 216, while comparing one or more sensor parameter values received over time, to one or more values or value patterns stored in the database 216. Database-stored values or value patterns, for example the fluid flow rates and the vibration levels/frequencies of a specific sensor monitored part(s) of the pipe network 102, may correspond to specific part failures, or to general failure type estimations, associated therewith.

Figure 2B:
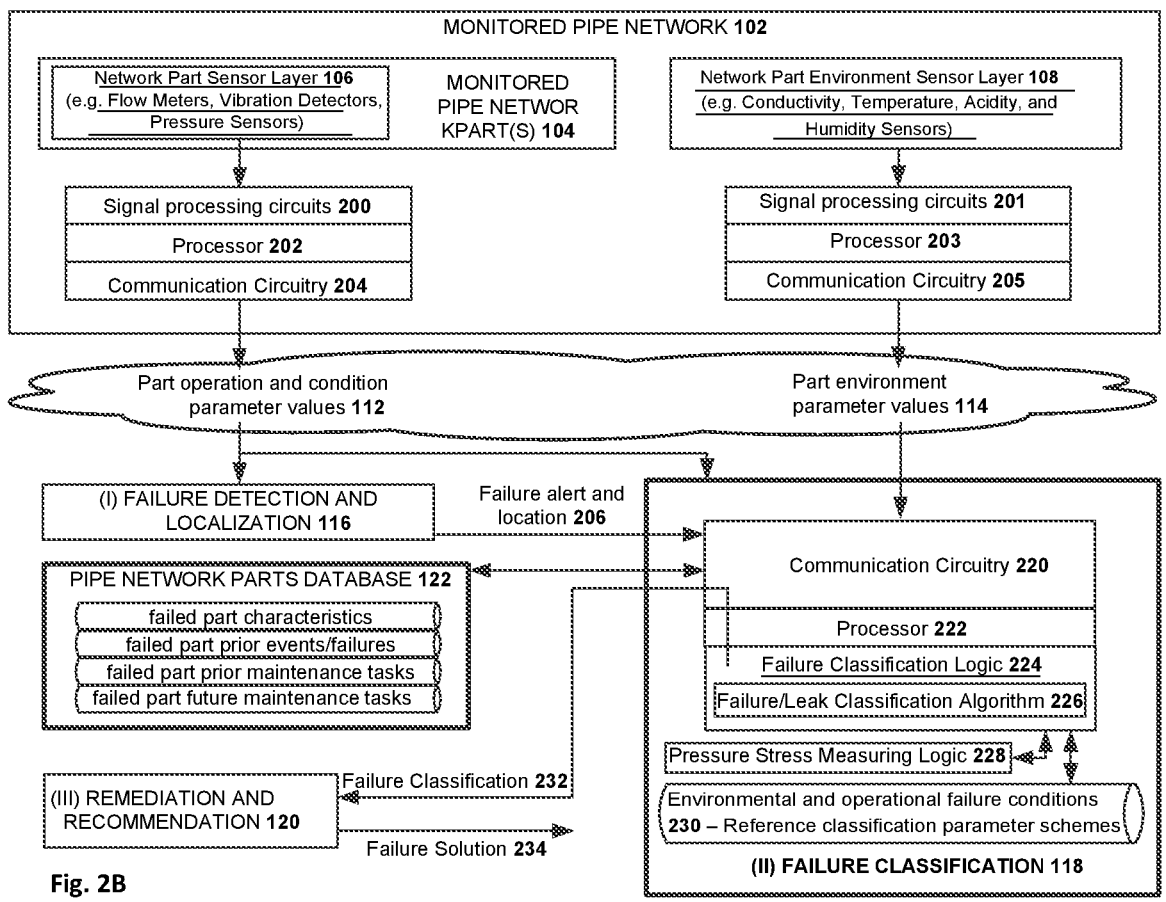
FIG. 2B is a block diagram illustrating an exemplary system for mechanical failure detection and classification according to some embodiments, in which the system's failure classification block is shown in further detail.

In FIG. 2B, there is shown a block diagram illustrating an exemplary system 100 for mechanical failure detection and classification, wherein the system's failure classification block 118 is shown in further detail. In some embodiments, the failure classification block is shown to include: (1) communication circuitry 220, for intermittently receiving a part failure notification 206 from the failure detection and localization block 116 communication circuitry 208, for intermittently receiving parameter values measured by the sensors of the network part sensor layer 106 and network part environment sensor layer 108 via communication circuitry 204 and 205, for relaying corresponding receipt acknowledgments, for referencing a pipe network parts database 122 and/or for relaying data indicative of the classification/cause of a system part failure; (2) a failure classification logic 224 for analyzing the parameter values received from the part operation and environment sensors and classifying the pipe network part failure detected by the system's failure detection and localization block 116; and (3) a processor 222 for managing the operation of the communication circuitry 220, the failure cause estimator and/or other system components.

In some embodiments, the failure classification logic 224 may execute a failure classification algorithm 226 for determining a part failure's classification 232, by referencing the environmental and operational failure conditions—reference classification parameter schemes database 230, while comparing one or more part(s) operation parameter values 112 and/or environment sensor parameter values 114 received over time, to one or more values or value patterns stored in the database 230. Database-stored values or value patterns, may correspond to specific part failure classes for classified failures to be associated therewith.

In some embodiments, the failure classification logic 224 and failure classification algorithm 226 thereof, may further reference via communication circuitry 208 the pipe network parts database 122, which stores various characteristics, maintenance, and/or event or failure history of the pipe network's part(s). Part characteristics, maintenance data, and/or failure history may be utilized by the classification algorithm 226 to further confirm, dismiss and/or otherwise affect its part failure classification 232.

For example, a recent maintenance check performed on a given part may lower the chance of wear-based failure of the part, thus increasing the chance of the failure being classified as caused by factors external to the system. Environmental sensor layer 108 can measure conditions that indicate a slow gradual increase in humidity levels around a given pipe network part which may, for example, be associated with a slowly corroding/rusting pipe section. However, if the pipe network parts database 122 indicates that this pipe section is made of a polymer, the option of a rusting pipe may be negated.

Figure 2C:
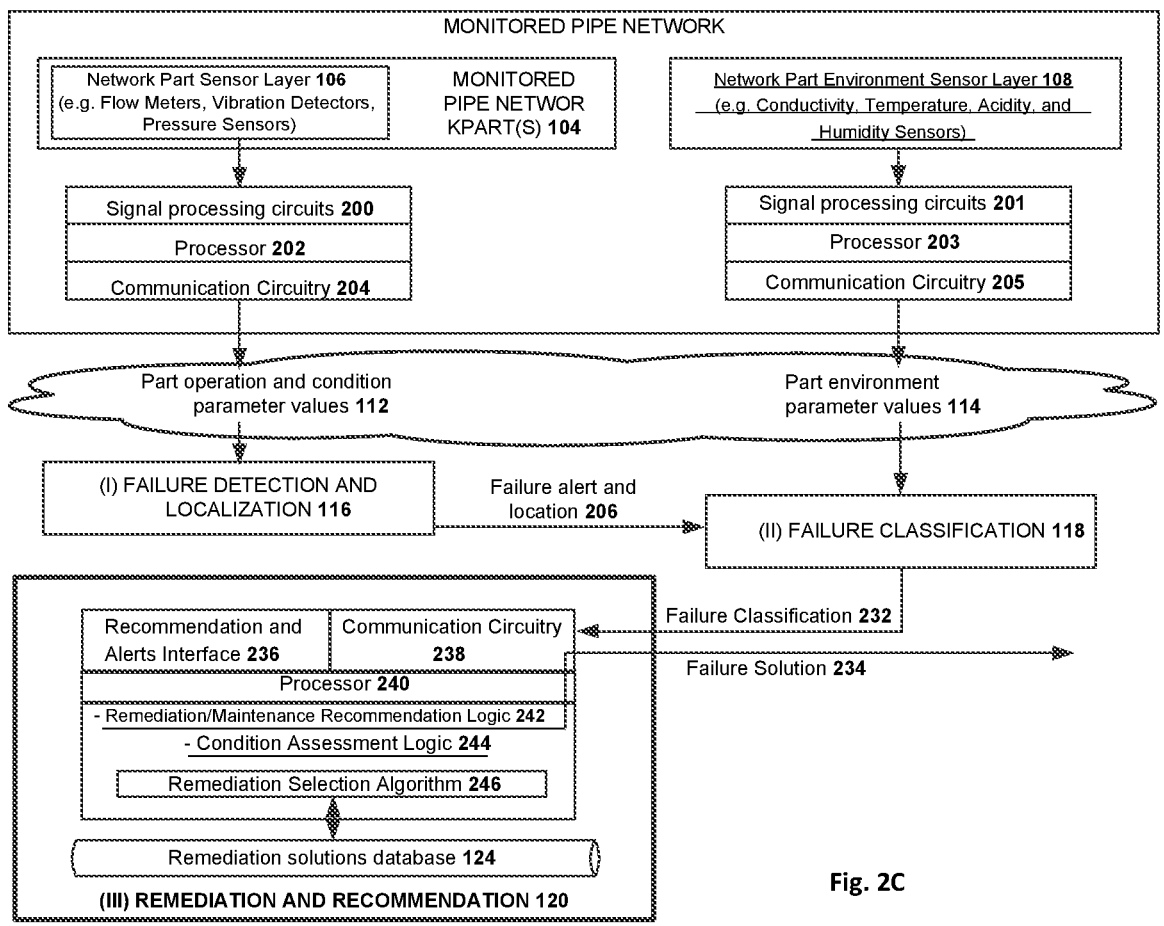
FIG. 2C is a block diagram illustrating an exemplary system for mechanical failure detection and classification according to some embodiments, in which the system's remediation and recommendation block is shown in further detail.

In FIG. 2C, there is shown, in accordance with some embodiments, an exemplary system 100 for mechanical failure detection and classification, wherein the system's remediation and recommendation block 120 is shown in further detail. In some embodiments, the remediation and recommendation block 120 is shown to include: (1) communication circuitry 238, for intermittently receiving a part failure classification 232 from communication circuitry 220, for relaying data offering a part failure solution 234 for system-detected pipe network failures and conditions for which a classification or assessment has been made, and/or for relaying remediation-related operation requests to one or more systems within the pipe network or are functionally associated with its operation; (2) a remediation/maintenance recommendation logic 242 for retrieving solutions matching specific pipe network part failures and conditions, as classified by the failure classification logic 224 or as assessed by pipe condition assessment logic 244; and (3) a processor 240 for managing the operation of the communication circuitry 238, the remediation/maintenance recommendation logic 242, and/or other system components.

In some embodiments, the remediation/maintenance recommendation logic 242 may execute a remediation selection algorithm 246 for referencing the remediation solutions database 124 by querying the database with the failure classification 232 or the network condition assessment and/or with additional data relating to the type of failure detected and/or pipe network part(s) associated therewith. A failure solution (remediation solution) 234 is triggered by the remediation and recommendation block 120 by querying the database 124 with the estimated failure classification 232. A remediation solution 234 may take the form of: (1) generating recommendations for parts/infrastructure repair or replacement; (2) alerting or notifying failure or failed-part related personal or systems, optionally with an action recommendation; and/or (3) automatically initiating, terminating and/or changing the operation of one or more failure associated systems.

In some embodiments, alerting or notifying failed-part related personnel or systems of a failure occurs through the recommendation and alerts interface 236. The alert may include an action recommendation derived from the remediation solutions database 124, or may take the form of sending a visual (e.g. picture, video), acoustic/vocal (e.g. alert sound, voice instructions) or written message (e.g. email, text instructions) to the pipe's network manager/administrator or to a manager/administrator of a system functionally associated therewith (e.g. municipal water supply, sewage, drainage systems). The message may include instructions for solving or minimizing the effect of the pipe network part(s) failure, wherein the instructions may comprise commands/requests for changes in the pipe network's operation—for example, instructions to slow or halt the feeding of fluid into the pipe network, instructions to replace or repair specific part(s), instructions to close/seal specific pipe network sections and/or specific pipe network valves, taps, stopcocks and/or faucets.

In some embodiments, automatically initiating, terminating and/or changing the operation of one or more failure associated systems, may for example include: the automatic slowing or halting the feeding of fluid into the pipe network, the automatic triggering of replacement or repairing operations, automatic alteration, rerouting or rechanneling of the fluid flow in the pipe network, automatic closing/sealing of specific pipe network sections and/or specific pipe network valves, taps, stopcocks and/or faucets.

According to some embodiments of the present disclosure, system sensors may continuously monitor a pipe network, intermittently providing measurements. Sensor measurements may, for example, be provided on a periodic (e.g. daily) basis, wherein: vibrations measured by sensors for a time period (e.g. for a few seconds), water meters readings and/or pressure sensors readings are communicated once, or several times, a time period (e.g. a day).

According to some embodiments, the estimated intensity of a leak in a pipe network, may be used for pipe network failure detection, classification and/or pipe condition assessment. The estimated intensity may be calculated based on readings from one or more acoustic/vibration sensors (the terms: acoustic, vibration and/or acoustic/vibration sensors, as utilized herein, may include any combination of accelerometer(s) and/or hydrophone(s)) and/or one or more water meters—monitoring the pipe network.

According to some embodiments, leak intensity may be estimated from, or calculated based on, vibration intensity as measured by acoustic/vibration sensor(s) installed in proximity to the leak; and/or by utilizing a cross correlation function of the vibration signal. The following is an exemplary formula for cross correlation of sensor measured vibration signals to a pipe leak intensity level, in accordance with some embodiments of the present disclosure.

According to some embodiments, a leak calculation model may, for example, estimate the intensity of a leak based on acoustic correlation measurements. The model, in accordance with some embodiments, may calculate leak intensity at least partially factoring field validated coefficients calculated based on multiple monitored real life leak cases and/or leak experiments, analyzed/conducted over a time period.

Leak intensity estimation, in accordance with some embodiments, may be applied for: (1) leak size/intensity based repair prioritization; (2) leak overtime growth based pipe condition assessment; (3) leak related fluid loss levels/amounts estimation; and/or others.

According to some embodiments, the leak calculation model—assuming two or more sensors over a leaking pipe section—measures the acoustic energy at the location of each sensor.

Figure 3A:
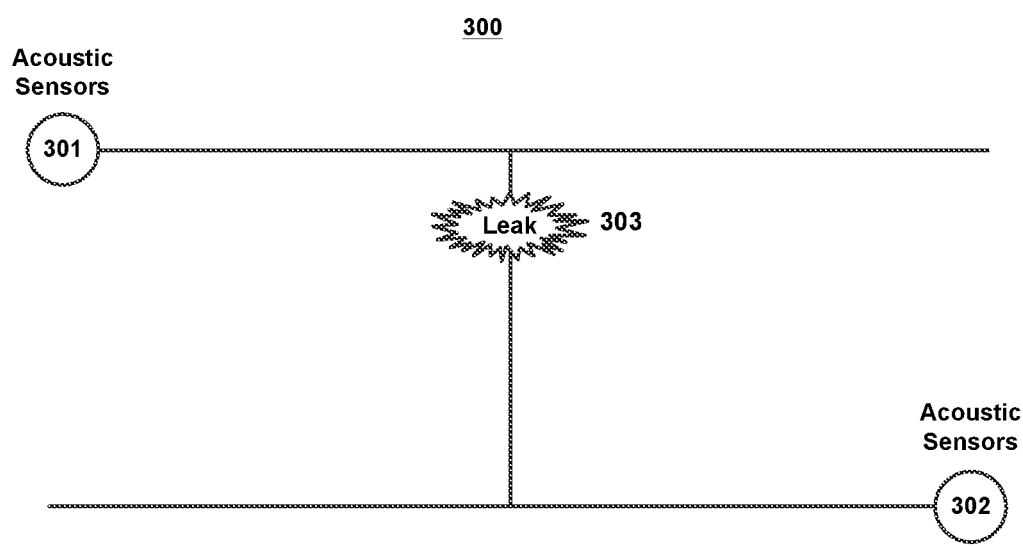
FIG. 3A is a schematic view illustrating an exemplary leaking pipe section over which two acoustic system sensors/sensor-units are positioned according to some embodiments.

FIG. 3A is a schematic view illustrating an exemplary leaking pipe section 300 over which two acoustic system sensors, 301 and 302, are positioned. In some embodiments, acoustic energy level data is collected by sensors 301, 302 and used to perform a correlation to matching flow intensity related characteristics and/or values. According to some embodiments, the distance between the two sensors shown in the figure may, for example, be anywhere between 200 and 600 meters and may depend on pipe topology, pipe material and/or other pipe network, or pipe network pipes, characteristics.

In some embodiments, the leak 303 is characterized by: (i) its flow; and (ii) its differential pressure. Differential pressure according to the present embodiment is the difference between the water pressure in the pipe and the pressure outside it. The power (watts) released by the leak jet of leak 303 may be calculated from the following formula:

Jet Power [N×m/s]=Flow [m³/s]×Pressure [N/m²]

According to some embodiments, a fraction of the calculated jet power is converted to the acoustic power that travels over the pipes to the sensors. A conversion ratio K1 may depend on numerous factors (i.e., the shape of the leak, etcetera) that influence the jet velocity.

In some embodiments, the acoustic vibrations from leak 300 propagate to the sensors 301, 302 along the pipe and may be represented by a characteristic attenuation coefficient K2. In order to estimate the acoustic power at the leak 303, a pipe attenuation model is implemented. The model assumes an attenuation coefficient over the pipe according to the pipe material and/or additional pipe characteristics. The calibrating of the model by measuring attenuation coefficient for the relevant pipes may improve its accuracy and may be applicable/scalable to large installation projects.

In some embodiments, acoustic power may be calculated by a function f, which factors in both the sensors signal correlation intensity and the signal attenuation in the pipes:

Acoustic Power,$P_a$=f(correlation intensity,attenuation)

In some embodiments, the calculated acoustic power and pressure may be factored as part of the leak flow calculation:

Leak Flow=Acoustic Power÷(Conversion Factor×Pressure)

Figure 3B:
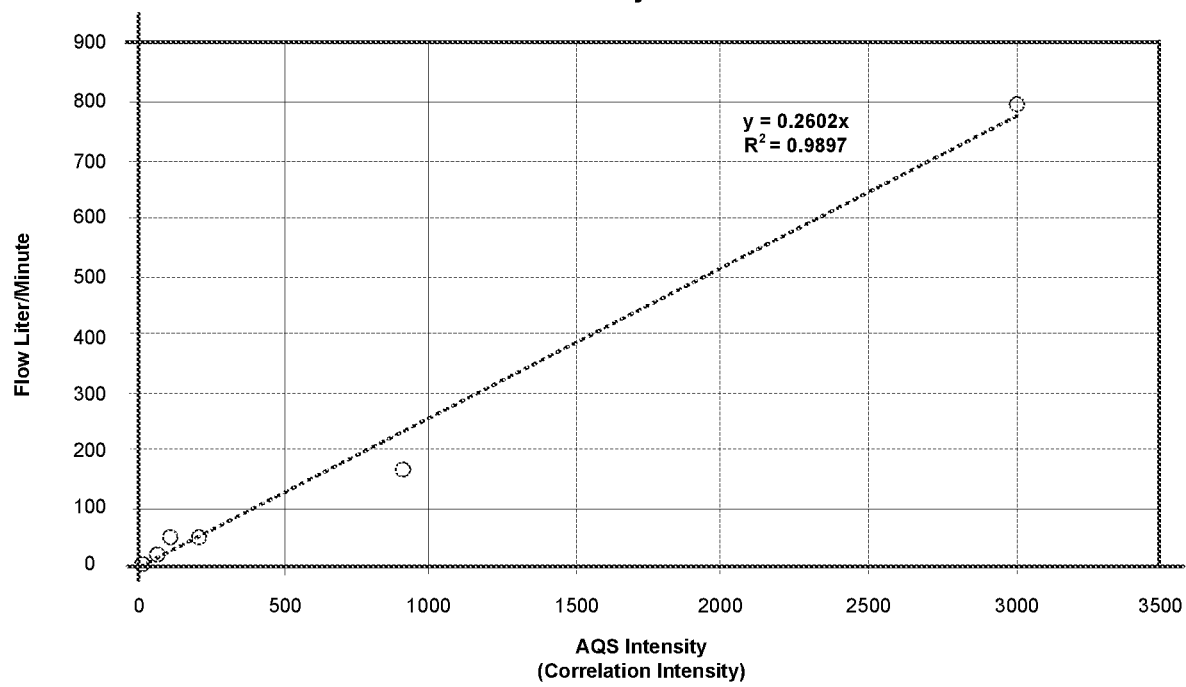
FIG. 3B is a graph of an exemplary empiric relationship between the calculated Leak Flow and Correlation intensity according to some embodiments.

In FIG. 3B, there is shown a graph illustrating an exemplary empiric relationship between the calculated Leak Flow and Correlation Intensity. The exemplary empiric relationship is based on measured leaks and hydrant openings at a pressure of ~4 Bars. It can be seen that the relationship between the calculated Correlation Intensity and Leak Flow, at a given pressure, is substantially linear.

In some embodiments, the cross correlation function, or another technique of pattern matching utilized, may enable the detection of a leak and calculation of the location of the leak. For example, based on the time shift between the received sensor signals, the failure detection and localization block 116 can calculate the leak location, and may be further utilized to estimate the acoustic energy at the source (i.e. at the location of the leak).

According to some embodiments, factors such as pipe attenuation, pressure and/or any other database stored or sensor measured factors, may be used for regulation, normalization, tuning and/or error correction of calculated leak intensity values.

According to some embodiments, the relative change in the intensity of a leak in a pipe network may be used for pipe network failure classification and/or pipe condition assessment. According to some embodiments, the relative change in the intensity of a leak, optionally without additional knowledge of the absolute values of the leak's intensity, may be indicative of the leak. A change in the intensity of a leak, the size of the change in relation to prior changes, and/or the size of change per time unit may provide understanding of the process of failure which caused the leak. This information further enables the system 100 to characterize and classify the failure based thereof and/or assess the condition of pipe network parts/sections at the location of the leak and/or at other pipe network locations.

According to some embodiments, flow meters in a pipe network, for example a district metering area (DMA), may be utilized by the system to estimate leak intensity. The rate of change of the flow may be factored as part of a leak's failure classification. For example, a sudden increase in the night flow (e.g., a flow at night) may provide indication of a burst in a network pipe, whereas a slowly growing night flow may provide indication of gradually developing leaks in the pipe network.

Figure 3C:
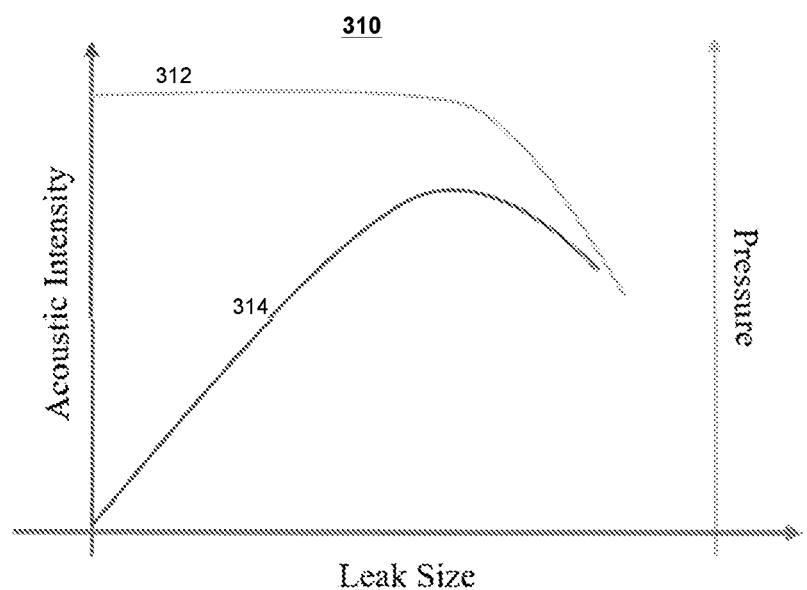
FIG. 3C is a graph of an exemplary empiric relationship between Acoustic Intensity, Leak Size, and Pressure according to some embodiments.

In FIG. 3C, there is shown a graph 310 of an exemplary empiric relationship between Acoustic Intensity, Leak Size, and Pressure illustrating the effects of a leak on acoustic intensity and pressure in the pipe network. In some embodiments, the cross correlation function may be adjusted to account for a severe pressure drop as a result of a burst pipe in the pipe network. Curve 312 correlates to a measured pressure in the pipe. Curve 314 correlates to the measured acoustic intensity in the pipe. As leak size increases, the measured pressure 312 in the pipe network decreases, and the measured acoustic intensity 314 decreases as a result. Hydraulic modeling is implemented in some embodiments to account for this change such that the failure detection and localization block 116 of the system 100 may detect a failure in a case where acoustic sensors detect a change in intensity 314 in the same time period as pressure sensors detecting a correlated change in pressure 312.

Figure 4:
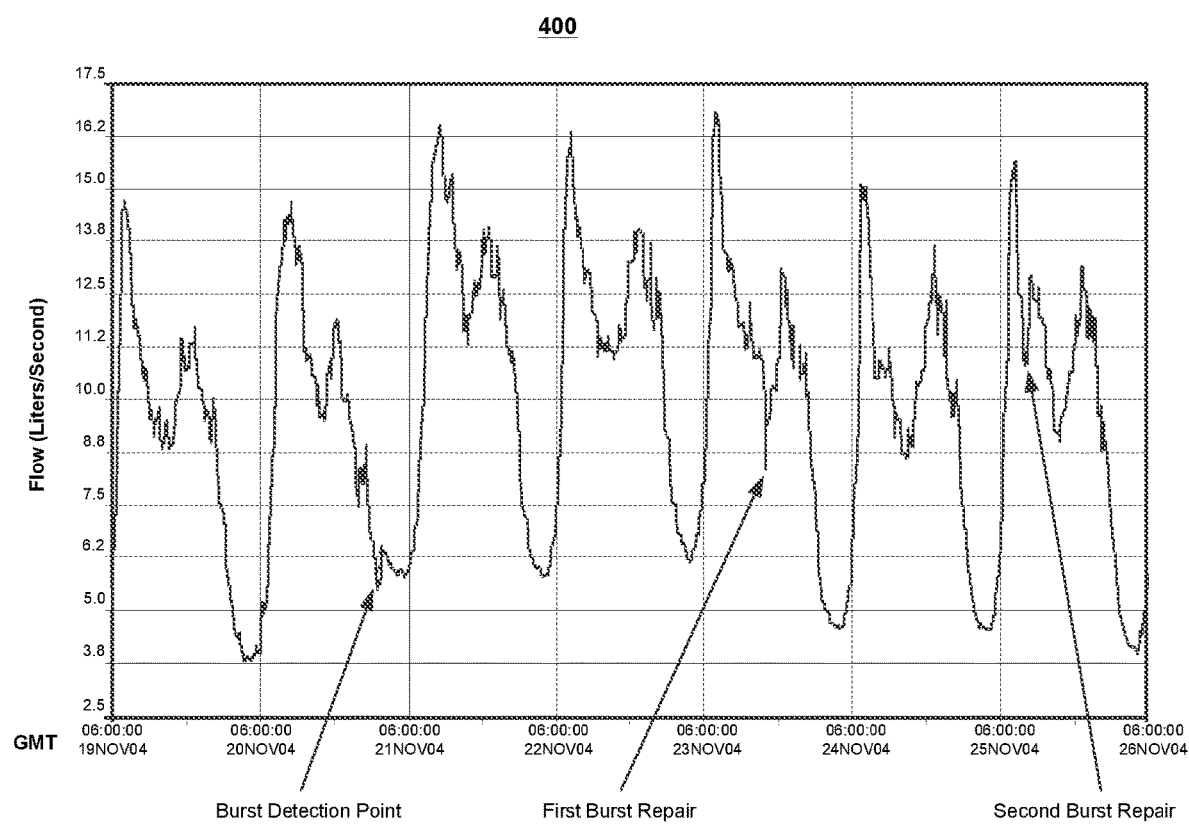
FIG. 4 is a graph illustrating an exemplary reading of a pipe network water meter flow intensity measured values, over a time period of a week according to some embodiments.

In FIG. 4, there is shown a graph 400 of an exemplary reading of water meter measured values over a time period of a week. Abrupt changes in the flow intensity values measured by the water meter as the 'burst detected' shown in the figure, may be indicative of a failure/leak and may be identifiable, by the system 100 in accordance with some embodiments of the present disclosure. The system 100 may detect a failure based on a combination of: the size/delta (amplitude) of the change, the rate/speed (steepness) of change, the time length (frequency) of the change, the time of day/week/month/year when the change occurred and/or the flow characteristics as measured prior to and after the detected change.

Further shown in the figure is an abrupt change in flow intensity indicative of and identified by the system as a repair of the failure/leak associated with the previously detected burst.

According to some embodiments, leak intensity change or change rate, may be used as a feature for pipe network failure classification and condition assessment. Either with, or without, knowledge of the exact/absolute intensity of a given leak, the change in the intensity may be factored to learn about the failure's mechanism. For example, a slow change in the intensity may indicate a slowly developing corrosion, possibly in its early stages; whereas a fast growth in intensity may indicate a corrosion in an already deteriorated metal pipe or a fast growing crack in a Polyvinyl Chloride (PVC) or an Asbestos-Cement (AC) pipe.

According to some embodiments, leak intensity levels and/or leak intensity change rates may be used as parameters, as part of a pipe network failure classification, condition assessment and/or failure/condition remediation/maintenance recommendation. Leak intensity levels and/or leak intensity change rates may be at least partially estimated by cross-correlation of sensor measured vibration/acoustic signals to corresponding pipe leak intensity levels or level changes.

According to some embodiments, the pressure within a pipe network and the change in pressure over time may be used for pipe network failure classification and/or pipe condition assessment. The pressure may be calculated based on readings from one or more pressure sensors, optionally positioned at multiple locations of the pipe network.

According to some embodiments, pressure levels within a pipe network and the changes in pressure over time may be used as parameters, as part of a pipe network failure prediction and classification, condition assessment and/or failure remediation/maintenance recommendation.

A system 100 in accordance with some embodiments, may include a pressure variation based stress measuring logic for estimating the stress on a network pipe that is induced by pressure changes. In some embodiments, the calculated induced stress may factor a combination of the rate of pressure changes over time, the amplitude or size of the changes, whether pressure transients have high values of both positive and negative pressure, and/or the diameter of the pipe in which pressure is being measured (the larger the pipe diameter is, the more sensitive it is for pressure transients and the prevalence of pressure transients is higher).

For example, if the typical pressure in a pipe is 4 bar—a pressure transient of 20 bars for over 100 ms may indicate a stress level that can tear the pipe or cause it to burst—and may accordingly trigger a respective alert, prediction and/or remediation. Alternatively, smaller oscillations of the pressure (in the same pipe) with an amplitude of only 3 bar may cause a pipe failure as well, if they appear more frequently—and may likewise trigger a respective alert, prediction and/or remediation.

The following is an exemplary formula for calculating the estimated stress on a pipe network pipe/part/section/location based on pressure sensors readings, in accordance with some embodiments of the present disclosure. The estimated stress, in accordance with some embodiments, may be proportional to the pressure level measured and to the diameter of the pipe; and inversely proportional to the pipe-wall thickness. For example, by the formula:

$$\text{Stress} = (P \times D)/(2 \times T); \text{ wherein: } P = \text{Pressure}, D = \text{Pipe Diameter and } T = \text{Pipe Wall}$$

Thickness. Pressure changes and/or pressure change patterns, causing stress (fatigue) above predefined or dynamically defined thresholds/limits may lead to pipe network failure. A system in accordance with some embodiments, may include one or more pressure sensors that are able to measure a range of pressure levels and pressure variations, from slow pressure variations that are caused by changes in pumping and consumption and up to fast pressure transients that result from pressure waves and can be intense.

A system 100, in accordance with some embodiments, may include, as part of the pressure variation based stress measuring logic or functionally associated thereto, a pressure stress (fatigue) factor calculation logic for calculating fatigue stress in network pipes based on readings from the pressure sensors monitoring the pressure in the pipe network. According to some embodiments, the pressure cycles in the pipes may be measured and then translated to the stress cycle amplitude and cycles/frequency. According to some embodiments, as part of fatigue stress calculation, negative pressure (creating radial/shear stress on pipe walls due to asymmetric loading and ground pressure) may be given a higher stress factor/weight than similarly sized positive pressure (creating circumferential stress in the pipe) which is considered less harmful (smaller failure potential) to a pipe.

According to some embodiments, the calculation of pressure transients caused pipe stress levels, may include a combination of the following steps: (1) measuring/calculating the amplitudes and number of cycles of pressure changes over a given time period; (2) translating pressure amplitudes to a stress levels in/on the pipe wall; (3) given the stress levels and the number of cycles over the given time period, calculating the fatigue factor/probability for failure, for example, using an S-N curve fatigue model.

Figure 5:
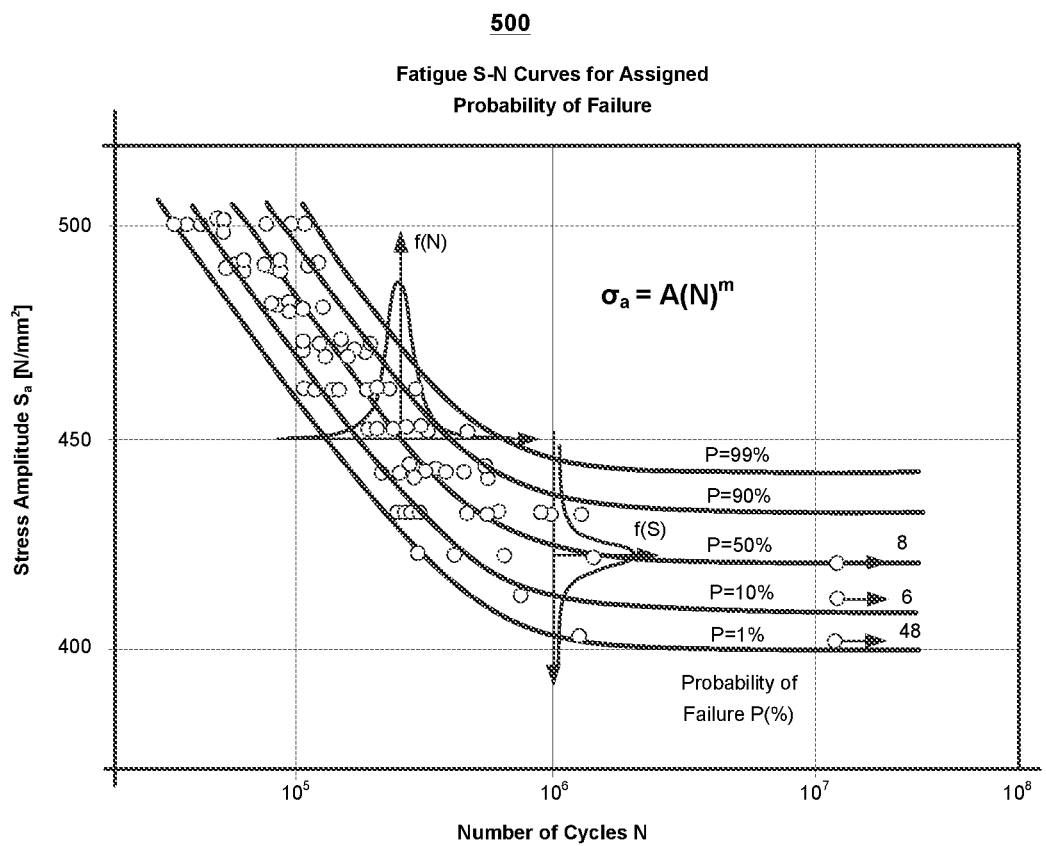
FIG. 5 illustrates an exemplary S-N curve fatigue model applicable to pipe network part/pipe fatigue calculation based on pressure transients caused pipe stress according to some embodiments.

In FIG. 5, there is shown, in accordance with some embodiments, a graph 500 of an exemplary S-N curve fatigue model applicable to pipe network part/pipe fatigue calculation based on pressure transients caused pipe stress, wherein individual pipe stress levels experienced (S) are based on the measured intensity of corresponding transients; and the number of experienced stresses (N) corresponds to the measured number of separate/different transients/shocks/waves.

A system in accordance with some embodiments may include, or have access to, a pipe network parts database 122. Network pipe features and characteristics data may be referenced and considered/factored as part of pipe network failure detection, failure classification, network condition assessment and/or failure/condition remediation/maintenance recommendation.

Exemplary features of a pipe may include: (1) pipe material: (a) metal: cast iron, ductile iron, steel, steel with cement coating, (b) plastic: polyvinyl chloride (PVC)/unplasticized polyvinyl chloride (UPVC), high-density polyethylene (HDPE)/medium-density polyethylene (HDPE), (c) asbestos-concrete (AC), (d) concrete; (2) pipe diameter; (3) depth of pipe installation; (4) pipe age; (5) specific information of pipe or installation (e.g. weakness in joints, sensitivity to corrosion); and/or other.

According to some embodiments, the environmental conditions at the proximity/surroundings of a pipe network and their changing over time, may be used for pipe network failure classification and/or pipe condition assessment. The environmental condition parameters may be used as part of the system's decision processes, for example as supportive information to strengthen/reaffirm, or weaken/contradict, classification and recommendation decisions based on other measured/stored data and features.

A system in accordance with some embodiments, may include one or more environmental sensors, optionally positioned at multiple locations in the proximity/surroundings of the pipe network. Environmental sensors readings may be considered/factored as part of pipe network failure detection, failure classification, network condition assessment and/or failure/condition remediation/maintenance recommendation.

Exemplary environmental parameters of a pipe network's proximity/surroundings, to be considered as part of the system's failure analysis decisions may include a combination of: (1) temperature and temperature change (e.g. from frost to warm, warm to frost); (2) soil acidity; (3) ground movements and vibration (e.g. due to traffic, constructions works); (4) stray currents in the ground from electrical grounding; (5) ground type (e.g. sand/clay or rocky—rocky ground causes cracks in plastic pipes); and or others.

A system in accordance with some embodiments, may include, or have access to a pipe network parts database.

Network pipe parts' history of failures data may be referenced and considered/factored as part of pipe network failure classification, network condition assessment and/or failure/condition remediation/maintenance recommendation.

Exemplary failure history data may include a database of prior leak parameter records, such as, but not limited to: (1) location of leak on a pipe network; (2) leaking pipe section details; (3) growth rate of leak over time; (4) leak size at the time of repair; (5) leak type (e.g. crack, hole, corrosion); and/or (6) other leak related data. A system in accordance with some embodiments, may include: a failure classification logic, a pipe condition assessment logic and/or a remediation/maintenance recommendation logic. The classification, assessment and recommendation logics may execute respective algorithm(s), wherein any combination of pipe network features and factors based on sensor collected data and pipe network pre-collected/stored data—as described and exemplified herein—may be used as factors, parameters and/or input values for the execution of the algorithms, potentially affecting the resulting algorithm outcomes/outputs, and failure classification, assessment and/or recommendation decisions that are based on the algorithms' outcomes/outputs).

The following is an exemplary method/technique, for implementation by system algorithms, for the automatic classification of failures and for 'failure class' based repair-recommendation and failure-prediction.

The method/technique, in accordance with some embodiments, may provide recommendations and/or predictions to some or all of the failure classes/classifications it receives as inputs. For example, only recommendations/predictions reached with a certainty/confidence level over a given threshold value may be provided by the algorithm. Recommendations/predictions failing to reach/pass the required certainty/confidence level threshold, or recommendations/predictions which are based on failure classifications failing to reach/pass a required classification certainty/confidence level threshold, are not executed/communicated, and/or filtered out of consideration.

According to some embodiments, a decision tree algorithm implementation may use pipe network features input parameters/values, and a set of predefined/dynamically-defined thresholds; to make failure classification decisions and to generate/select recommendations for their repair based thereof.

An exemplary system operation scenario, including a classification method/technique implementing a decision tree algorithm, may include: (1) monitoring a pipe network for failure based on a combination of vibration/acoustic sensors and flow meters readings/data; (2) monitoring the pipe network for vibration/acoustic signals, pressure and pressure transients and/or environmental parameters; (3) upon detection of a pipe network failure (detection optionally including the failure's locating within the pipe network) referencing/retrieving: (a) monitored vibration/acoustic data, pressure related data and/or environmental data, associated with the failed network pipe/part; and/or (b) physical parameters/specifications data and/or failure history data, of the failed network pipe/part and/or pipes/parts operationally related thereto; and/or (4) executing the decision tree classification algorithm, using: (a) at least some of the referenced/retrieved data types as input parameters/values for the decision tree algorithm's execution; and (b) decision thresholds that may be calculated theoretically, empirically, statistically, and/or fitted by machine learning using examples (e.g. examples, otherwise determined as successful) as a training set(s).

Figure 6A:
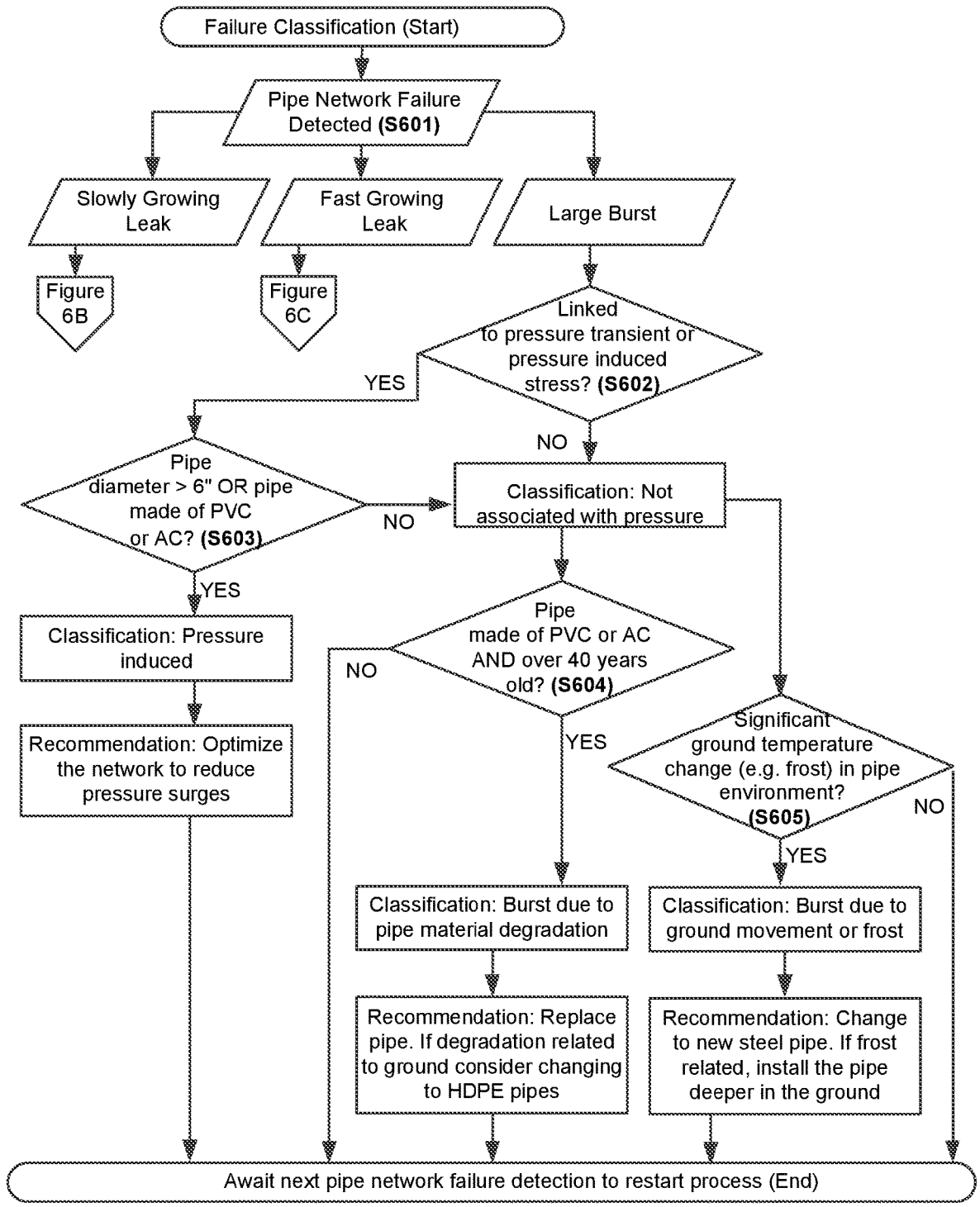
FIG. 6A is a flowchart illustrating an exemplary decision tree algorithm flow chart for classification and analysis of a large burst in a pipe network.
Figure 6B:
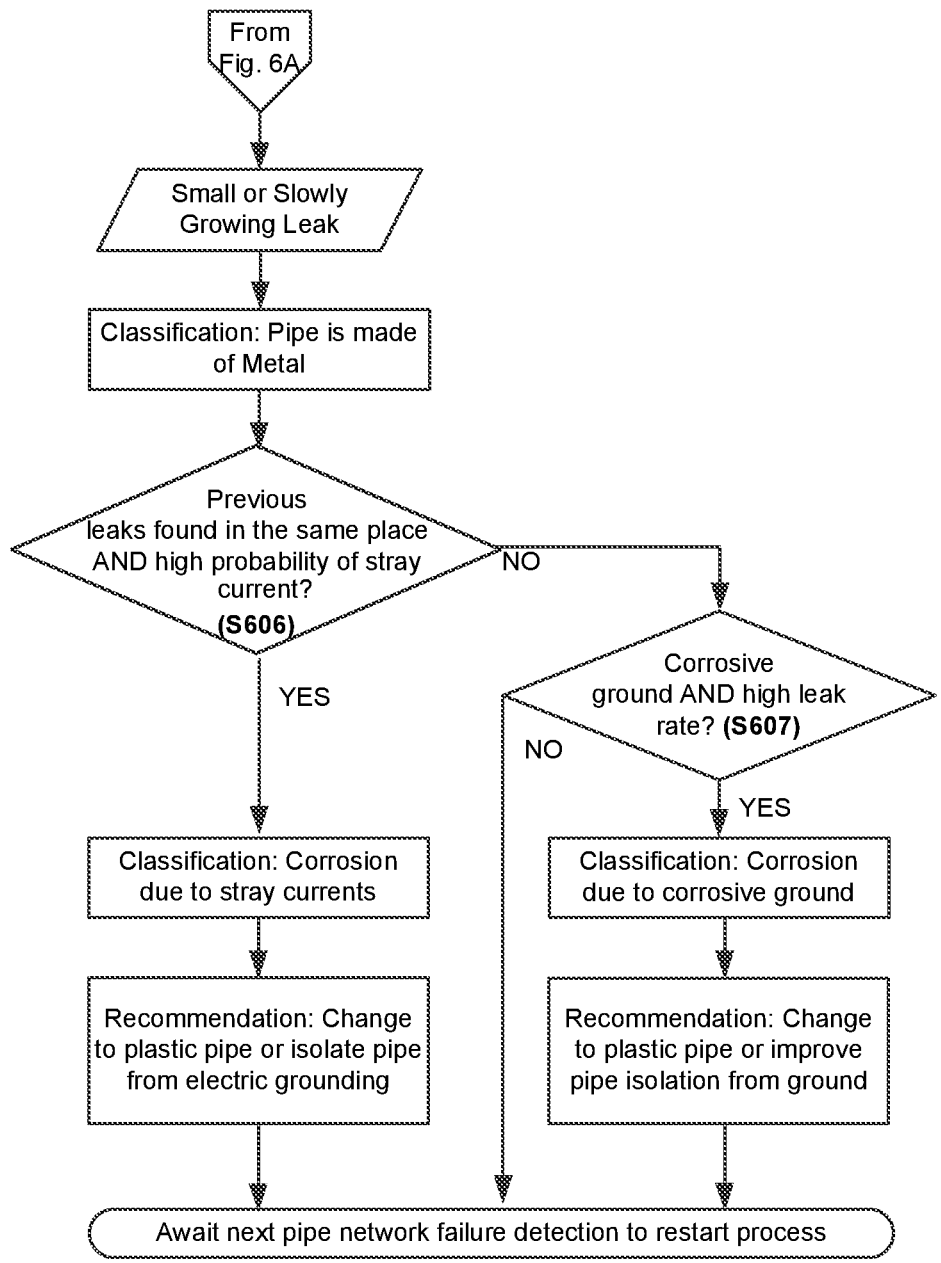
FIG. 6B is a flowchart illustrating an exemplary decision tree algorithm flow chart for classification and analysis of a slowly growing leak in a pipe network.
Figure 6C:
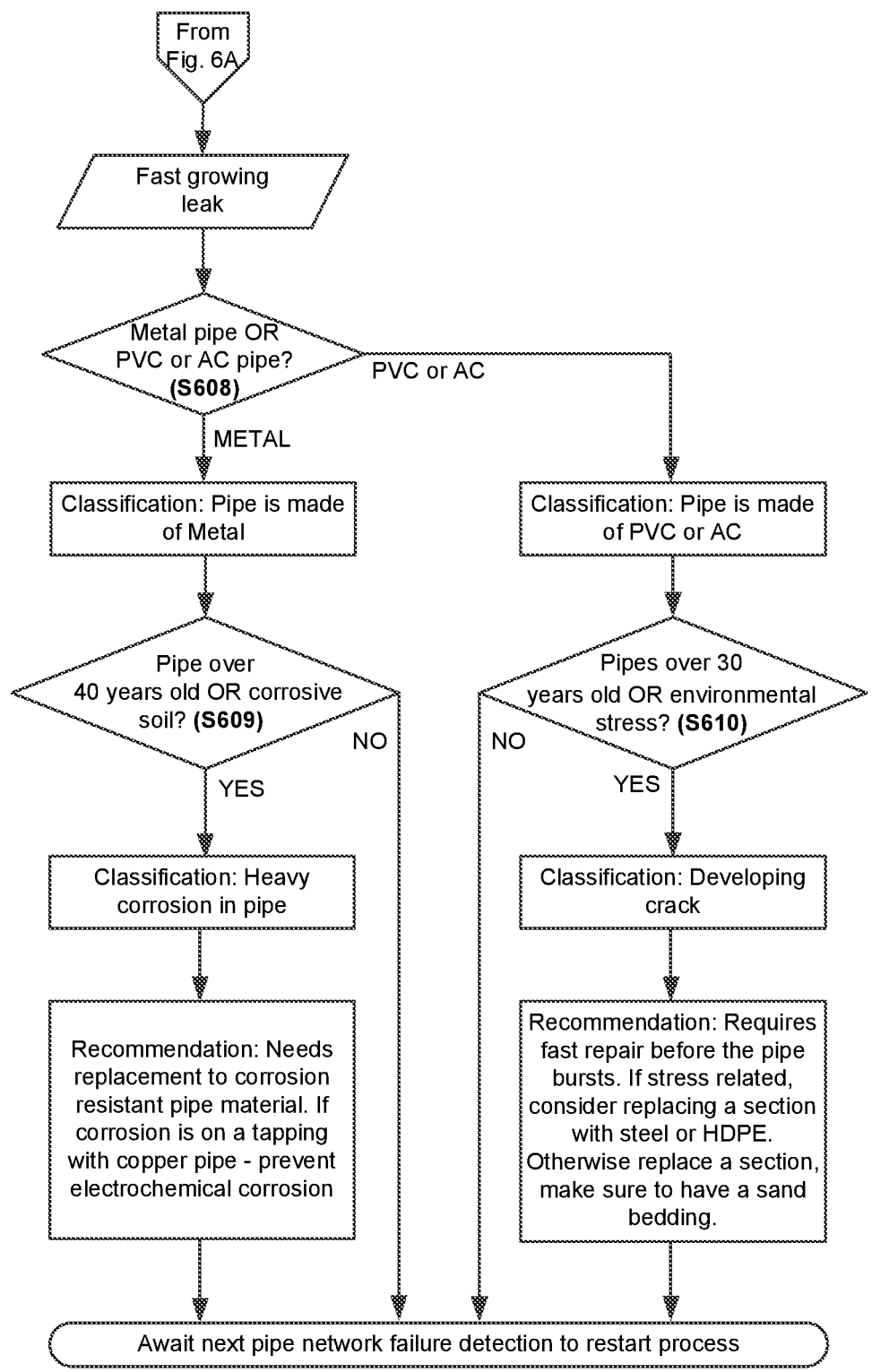
FIG. 6C is a flowchart illustrating an exemplary decision tree algorithm flow chart for classification and analysis of a fast growing leak in a pipe network.

FIGS. 6A-C illustrate a flowchart of an exemplary decision tree algorithm in accordance with some embodiments of the present disclosure. The flow charts may collectively form a pipe network failure classification and repair recommendation technique/method, implementable by a system in accordance with some embodiments of the present disclosure. Each of the flow charts constitutes a decision tree algorithm for analyzing/handling leaks (failures) having different intensity characteristics: FIG. 6A includes leaks on the scale of a large burst; FIG. 6B includes a slowly growing leak; and FIG. 6C includes a fast growing leak. Leak intensity, or intensity change rates, may for example be calculated/estimated based on flow meters readings and/or acoustic/vibration sensors collected data, as described herein.

In accordance with some embodiments, FIG. 6A shows a flowchart 600 illustrating a methodology for classification of a pipe network leak failure using an exemplary decision tree algorithm, more particularly associated with a large burst in a pipe. The threshold values and conditions, selected for and described in the figure, are optional examples and are not, in any way, to limit the scope of the related teachings.

In the figure, a step S601 shows an initial stage of classification/characterization of a detected pipe network failure—based on leak intensity and intensity change rates—as resulting from or being related to either: a large pipe burst, a slowly growing leak; or a fast growing leak.

The failure of FIG. 6A, classified as a 'large pipe burst,' is analyzed as follows.

In some embodiments, a step S602 determines whether the failure is linked to a pressure transient or pressure induced stress, for example, based on pressure sensors collected data.

In some embodiments, upon determination that the failure is linked to a pressure transient or pressure induced stress, step S603 determines whether the failed pipe diameter is greater than 6 inches or whether the pipe is made of PVC or AC, for example, by referencing the pipe network parts database 122 for records of the failed pipe.

In some embodiments, upon determination that the pipe diameter is greater than 6 inches OR the pipe is made of PVC or AC, the system 100 classifies the failure as pressure-induced, and recommends optimization of the network to reduce pressure surges.

In some embodiments, if step S602 determines the failure is not linked to pressure transient or pressure induced stress, or if a step S603 determines the failed pipe diameter is not greater than 6 inches AND the pipe is not made of PVC or AC, the system classifies the failure as not associated with pressure.

In some embodiments, if failure not associated with pressure, a step S604 determines whether the pipe is made of PVC or AC AND over 40 years old. If the pipe has these characteristics, the system classifies the failure as a burst due to pipe material degradation, and generates a recommendation to replace the pipe or change to HDPE pipes if the degradation is related to the ground.

In some embodiments, if failure not associated with pressure, a step S605 determines whether significant ground temperature change (e.g. frost) was/is experienced in pipe environment. If a significant ground temperature change (e.g. frost) occurred, the system classifies the failure as a burst due to ground movement or frost, and generates a recommendation to change the failed pipe to new steel pipe or installation of the pipe deeper in the ground if frost related.

In some embodiments, once a failure classification and a matching recommendation have been made, or if no classification has been established, the system/algorithm may wait for the next failure detection to repeat the algorithm flow.

In accordance with some embodiments, FIG. 6B shows a continuation of the flowchart 600 illustrating a methodology for classification of a pipe network leak failure using an exemplary decision tree algorithm, more particularly associated with a slowly growing leak in a pipe. The threshold values and conditions, selected for and described in the figure, are optional examples and are not, in any way, to limit the scope of the related teachings.

The failure of FIG. 6B, classified as a 'small or slowly growing leak,' is analyzed as follows.

In some embodiments, upon determining the failure is a small or slowly growing leak based on intensity values in step S601, the pipe failure is classified as a metal pipe failure.

In some embodiments, a step S606 determines the failure as pipe corrosion due to stray currents based upon whether previous leaks were found in the same location or section of the pipe network and there is a high probability of a stray electric current. Step S606 generates a recommendation to change from metal to plastic pipe or to isolate the pipe from electric grounding.

In some embodiments, if previous leaks were not found in the same location or section of the pipe network and/or there is a low probability of a stray electric current, a step S607 determines whether the ground is corrosive and the leak has a high growth rate. Step S607 then classifies the failure as corrosion due to corrosive ground, and generates a recommendation to change to plastic pipe or improve pipe isolation from ground.

In some embodiments, once a failure classification and a matching recommendation(s) have been made, or if no classification has been established, the system/algorithm may wait for the next failure detection to repeat the algorithm flow.

In accordance with some embodiments, FIG. 6C shows a continuation of the flowchart 600 illustrating a methodology for classification of a pipe network leak failure using an exemplary decision tree algorithm, more particularly associated with a fast growing leak in a pipe. The threshold values and conditions, selected for and described in the figure, are optional examples and are not, in any way, to limit the scope of the related teachings.

The failure of FIG. 6C, classified as a 'fast growing leak,' is analyzed as follows.

In some embodiments, a step S608 determines whether the pipe is made of metal OR of PVC or AC by referencing the pipe network parts database 122. If the pipe is determine to be metal, the failure is classified as a metal pipe failure; if the pipe is PVC or AC, the failure is classified as such.

In some embodiments, upon determining if the pipe is metal, the method proceeds to a step S609, which determines whether the pipe is over 40 years old OR the soil is corrosive. If either of these apply to the pipe section in question, the metal pipe failure is further classified as related to heavy corrosion in pipe.

In some embodiments, if step S608 determines that the pipe is made of PVC or AC, a step S610 determines whether the pipe is over 30 years old OR environmental physical stress was applied to it. Upon such determination, the system further classifies the failure as a developing crack, and generates a recommendation to complete a fast repair by replacing the pipe section before the pipe bursts. If the failure is determined to be particularly stress-related, the recommendation may further contain instructions to replace section with steel or high-density polyethylene (HDPE).

In some embodiments, once a failure classification and a matching recommendation(s) have been made, or if no classification has been established, the system/algorithm may wait for the next failure detection to repeat the algorithm flow.

The following is an exemplary method/technique, for implementation by a system algorithm(s), for the automatic classification of failures and for 'failure classes' based repair-recommendation and failure-prediction. According to some embodiments, a machine learning model implementation may classify system detected failures using pipe network features input parameters/values.

According to some embodiments, a supervised learning approach may be used to train the model, wherein sets of pipe network features parameters/values, of failure examples correctly classified by human experts/curators or by another classification method/technique (e.g. a decision tree), are used as the model's training data.

According to some embodiments, the type of feedback, or lack of such, received following to a classification made by the machine learning model, may be used to tune the neural network cells of the model. For example, a pipe network failure/leak classification decision made by the model may be examined within the following time period. Further failure/leak detections related to the same network pipe(s)/part(s) within a given following time period may be indicative of an initial classification decision by the model, that did not help solve the failure/leak (i.e. repair recommendations generated/selected based on the model made classification did not solve failure or prevent its reassurance)—accordingly, the level of correctness of the model's initial decision may be tuned down. Lack of failure/leak detections related to the same network pipe(s)/part(s) within a given following time period, on the hand, may be indicative of an initial classification decision by the model, that did help solve the failure/leak—accordingly, the level of correctness of the model's initial decision may be tuned down.

According to some embodiments, once the model is trained the system may automatically classify the pipe network failures according to predefined, and/or optionally machine defined, classes. The machine learning model's classification algorithm may be one of, or may include a combination of, the following algorithms: Linear Regression; Logistic Regression; K-Nearest Neighbors; and/or any other algorithm, known today or to be devised in the future, for classification problems.

According to certain aspects, embodiments provide a system (e.g., the system 100 in FIG. 1A) for pipe condition assessment. The system may include at least one sensor (e.g., the network part sensor layer 106 in FIG. 1A) installed on a pipe for monitoring operations of the pipe. The system may further include a processor (e.g., the processor 202 in FIG. 2A) configured to analyze data output from the sensor. The processor may be further configured to extract features related to operations of the pipe (e.g., part operation and condition parameter values 112) based on the analysis of the sensor data.

According to some embodiments, the at least one sensor may include at least one of an acoustic sensor (e.g., acoustic sensors 301, 302 in FIG. 3A) or water meter (e.g., network part sensor layer 106 in FIG. 1A). The processor may be further configured to detect leaks based on data output from the at least one acoustic sensor or water meter (e.g., with the operation failure detector 212 in FIG. 2A). The processor may be further configured to estimate leak intensity and leak growth rate of the detected leaks (e.g., with the failure classification logic 224 in FIG. 2B).

According to some embodiments, the at least one sensor may include a pressure sensor (e.g., network part sensor layer 106). The processor may be further configured to detect pressure changes and pressure surges and correlate the detected pressure changes and pressure surges with appearance and growth of leaks (e.g., with the failure classification logic 224). The processor may be further configured to calculate pressure stress exerted on a section of the pipe (e.g., with the pressure stress measuring logic 228 in FIG. 2B) based on data output from the pressure sensor. The processor may be further configured to perform a condition assessment of the pipe based on the calculated pressure stress (e.g., with the condition assessment logic 242 in FIG. 2C).

II. System and Method for Pipe Condition Assessment and Optimal Maintenance Recommendation Using Continuous Monitoring Sensors and Data According to some embodiments, the present disclosure is directed to a method for pipe condition assessment and optimal maintenance recommendation. More specifically, it is directed to a method consisting of a model-based approach for pipe condition assessment and optimal maintenance recommendation, which may be utilized by the system 100 described above.

Estimation or measurement of pipe condition is important for optimal pipe replacement. Although possible to retain records of the history of repairs on a pipe section in a pipe network, it is beneficial for maintenance and failure prevention purposes to know the potential for future failure due to ongoing corrosion progression (e.g., corrosion pits). If the pipe upon last inspection contains a high density of corrosion pits that may soon develop into leaks, it may be used as an important factor for deciding to replace the pipe or pipe section in the near future. Furthermore, if leak repair history data stored in the pipe network parts database 122 shows that corrosion was present, however located in copper pipe connection points, the pipe section may still be solid and the failure was a result of electro-chemical corrosion between cast iron or ductile iron and the copper.

Figure 7:
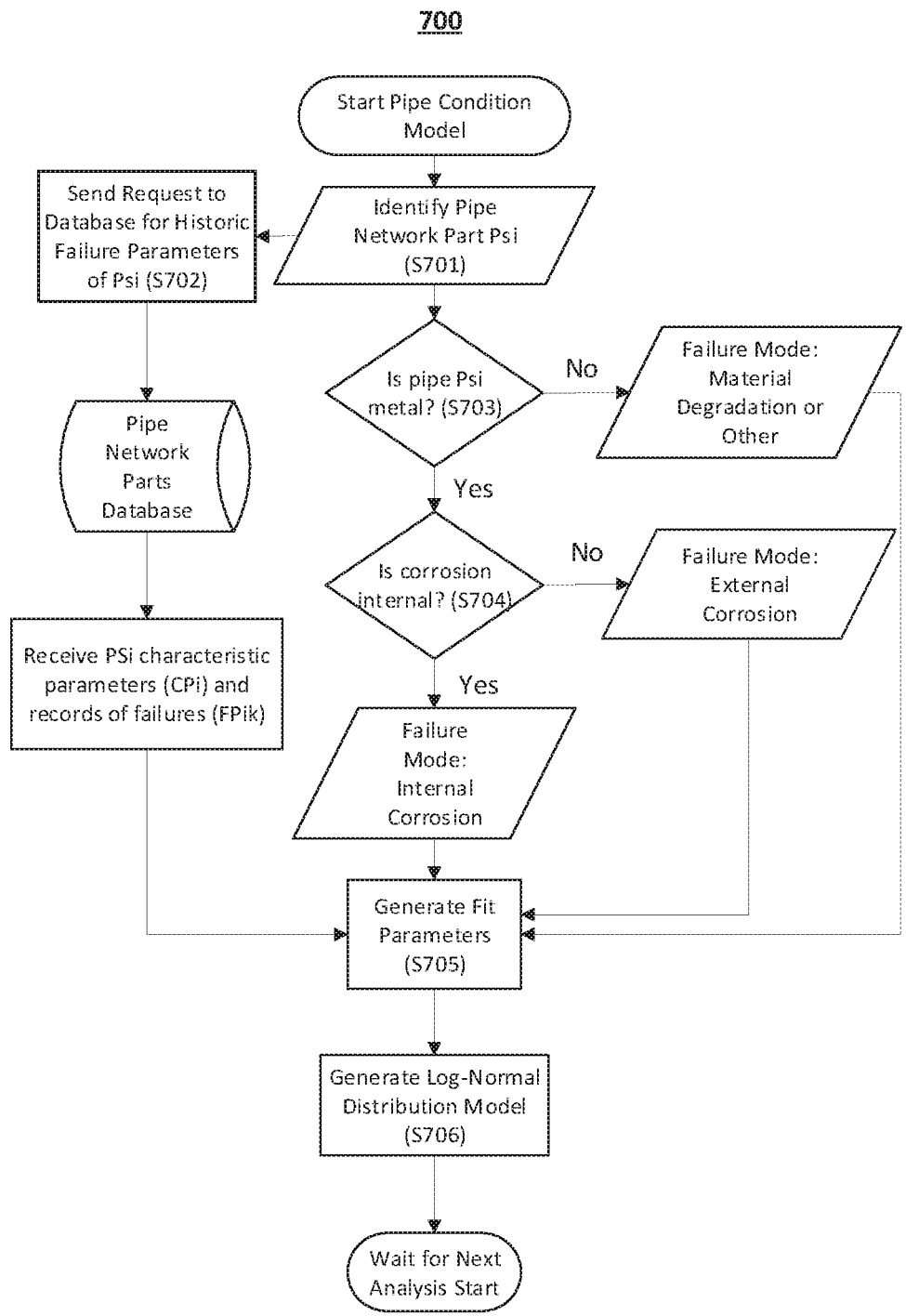
FIG. 7 is a flow chart illustrating a methodology for creating a statistical model for estimation and prediction of the pipe condition in terms of corrosion pit-depth distribution.

In FIG. 7, there is shown an example flow chart for a methodology to generate a statistical model for estimation and prediction of the pipe condition in terms of corrosion pit-depth distribution. The threshold values and conditions, selected for and described in the figure, are optional examples and are not, in any way, to limit the scope of the related teachings.

According to some embodiments upon starting the method to generate a predictive statistical model for pipe condition based on corrosion, a step S701 performed by the system 100 identifies the pipe network part 104 or pipe section (PSi) for analysis. PSi may be any monitored pipe network part 104 monitored by the system 100. PSi may be a pipe section of a certain length or area that encompasses several parts of the pipe network.

According to some embodiments, a step S702 sends a request from the system 100 to the pipe network parts database 122. The pipe network parts database 122 may store part characteristics, prior events and failures, prior maintenance tasks, and/or future maintenance tasks. Pipe network parts database 122 may store historic records of leaks labeled by failure type including corrosion, ground movement, and leak location. Pipe network parts database 122 may include attributes of pipe PSi including material, diameter, year of installation, working pressure, pressure transients, temperature changes, wall thickness, ground corrosiveness, ground conductivity, copper pipe connection density per unit length, etc.

In some embodiments, a step S703 performed by the processor 222 with data from the pipe network parts database 122 determines whether the pipe PSi is a metal part in accordance with some embodiments. If pipe PSi is not metal and is instead PVC or AC, the failure mode is classified as material degradation or other causes not related specifically to corrosion. If pipe PSi is metal, the failure mode is classified as corrosion-related and requires further classification.

According to some embodiments, a step S704 performed by the processor with data from the pipe network parts database 122 determines whether the corrosion is internal corrosion or external corrosion based on previous inspections and data such as a type of fluid within the pipe network, and further classifies the failure mode as such.

In some embodiments, a step S705 generates fit parameters (FP) for the statistical modeling according to some embodiments. These fit parameters can be generated by the system 100 processor 222 or another processor of system 100. The fit parameters are determined from characteristic parameters (CPi) and records of failures (FPik) in conjunction with the classified failure mode. For example, if pipe PSi has a failure mode of external or internal corrosion, fit parameters for a pipe PSi are calculated in terms of corrosion pit-depth in a pipe unit length and/or average pit depth. The fit parameters are translated into a vector of data for the purpose of generating a best-fit model.

In some embodiments, a step S706 uses at least one fit parameter determined by step S705 to determine a statistical model Mi that best describes the probability distribution of weak points per pipe length that may lead to failure. Step S706 can be performed by processor 222 or any other processor of the system 100. The weak points can be corrosion pit-depths in metal pipes, material deterioration factors in AC pipes, micro-cracks, etc. Continuing the previous example, external corrosion is the predominant failure mechanism in metal pipes, and potential corrosion pit-depth distribution can be estimated by the log-normal probability distribution function:

$$f(y_0, \mu, \sigma, A) = y_0 + \frac{A}{\sqrt{2\pi}\,\sigma x} \times e^{-ln(\frac{x}{\mu})^2/2\sigma^2}$$

In accordance with some embodiments, in the function above μ is the average and a is the standard deviation.

Figure 8:
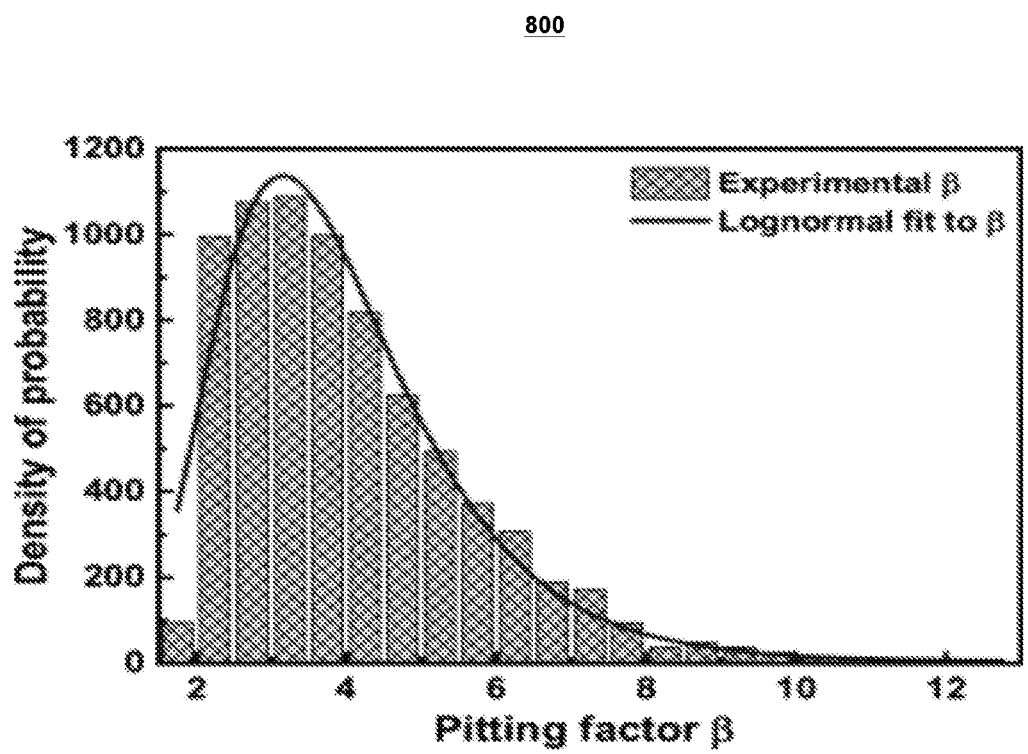
FIG. 8 is a graph illustrating an exemplary statistical model illustrating corrosion pit depth distribution as a function of a pitting factor according to some embodiments.

In FIG. 8, a graph 800 is shown illustrating an exemplary statistical model according to the log-normal function illustrating corrosion pit depth distribution as a function of a pitting factor β according to some embodiments. In some embodiments, the histogram under the curve is a set of experimental measures of effective corrosion pit depth in a given pipe unit length and the curve is the log-normal distribution according to the fit parameter β. It can be seen in the figure that over large samples, the lognormal distribution can provide very accurate results of corrosion pit distribution.

Figure 9:
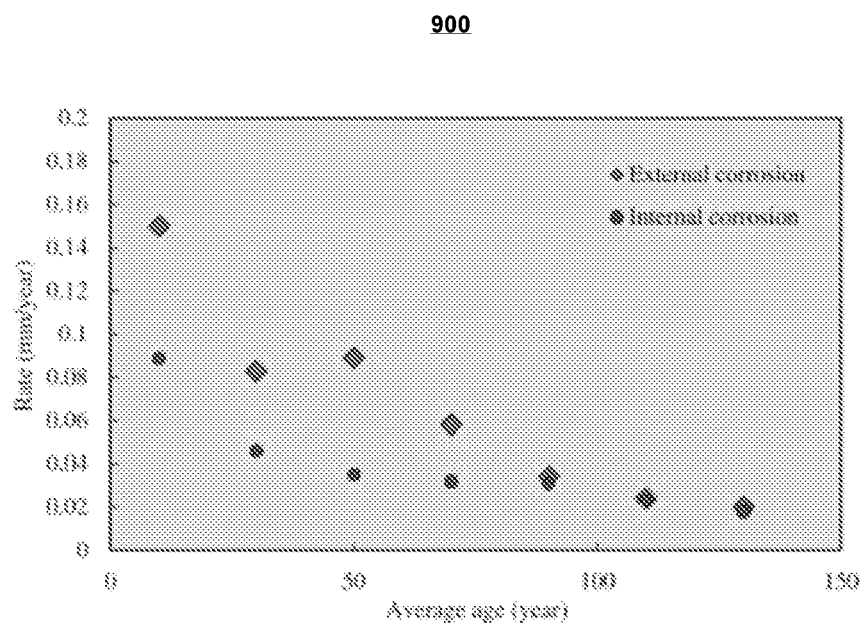
FIG. 9 is a graph illustrating an exemplary corrosion rate model as a function of time according to some embodiments.

In FIG. 9, a graph 900 illustrating an exemplary corrosion rate model as a function of time in age of the pipe according to some embodiments is shown. In some embodiments, the rate of corrosion can be calculated as a function of pipe age, and be separated into external and internal corrosion based on pipe characteristic and environment parameters. From the corrosion rate model, a corrosion rate coefficient can be used to recalculate the corrosion distribution equation to include time as a factor.

Figure 10:
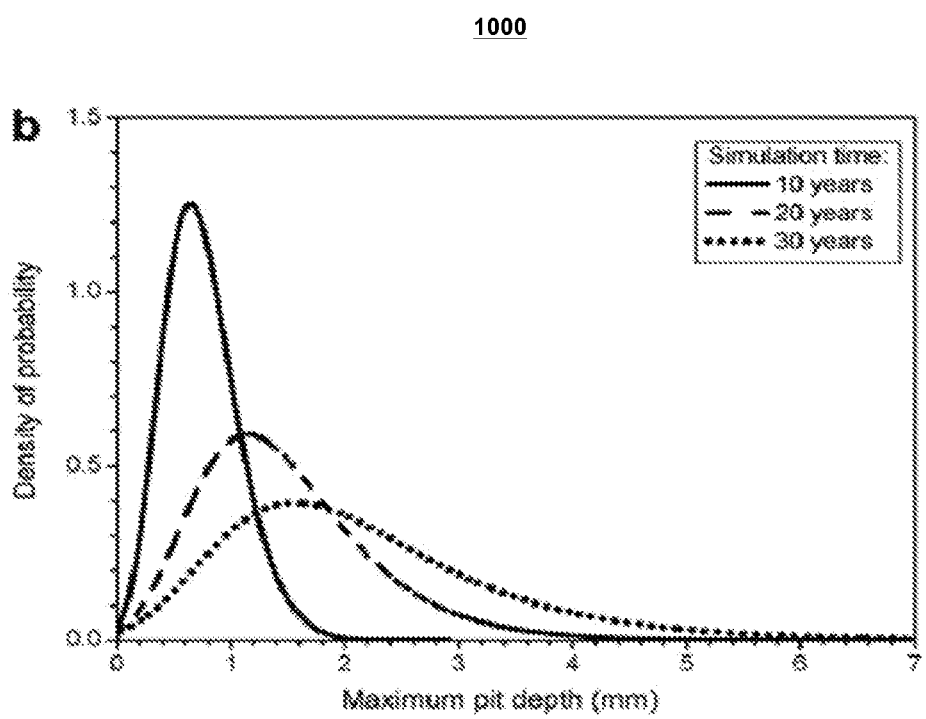
FIG. 10 is a graph illustrating an exemplary future corrosion distribution as a function of time and maximum pit depth in millimeters according to some embodiments.

In FIG. 10 there is shown a graph 1000 illustrating an exemplary future corrosion distribution as a function of time and maximum pit depth in millimeters according to some embodiments. In some embodiments, the corrosion rate coefficient obtained from the corrosion rate model in FIG. 9 can be used to scale the corrosion distribution by time using the following relationships: $\mu=\mu_0+$(corrosion rate×time);

$$\sigma = \sigma_0\left(\frac{\mu}{\mu_0}\right).$$

In accordance with some embodiments, three possible distribution curves are shown in the graph at different simulation times of 10 years, 20 years, and 30 years. It can be seen that the density of probability of maximum pit depth in millimeters increases over time. In other words, as a pipe ages and corrosion has more time to progress, pit depth will increase in all corrosion pits, and the average ($\mu$) pit depth will be deeper and will shift the probability curve to the right along the x-axis. The standard deviation ($\sigma$) of the pit depth will also increase, causing the area under the curve (the density of probability) to be spread out further in the horizontal direction, resulting in a lower peak at the average pit depth.

Figure 11:
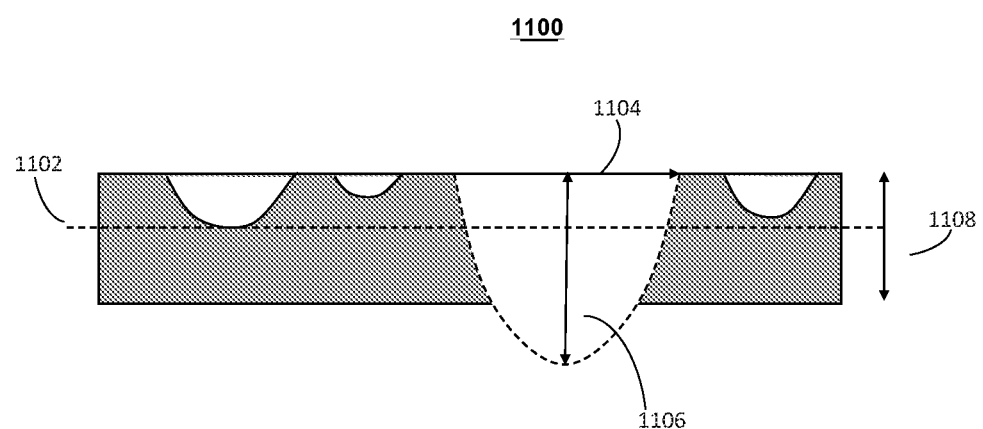
FIG. 11 is a schematic diagram illustrating a section of a pipe wall and its corresponding relevant failure parameters for modeling corrosion distribution according to some embodiments.

FIG. 11 is a schematic diagram illustrating a section of a pipe wall and its corresponding relevant failure parameters for modeling corrosion distribution according to some embodiments. In some embodiments, the pipe wall section 1100 is an exemplary embodiment of how to estimate the effective pit depth of a corrosion pit from a leak diameter.

In some embodiments, the pipe wall section 1100 has an average pit depth 1102 that is determined to be the average depth including all corrosion pits in a given length of pipe wall with thickness 1108. It can be seen that a corrosion pit that has breached the total wall thickness 1108 to become a leak in the pipe. However, the pipe leak diameter itself is not a relevant failure parameter or fit parameter to the probability distribution function for corrosion pit depth.

In some embodiments, if the corrosion pit is assumed to take a parabolic shape, the leak diameter 1104 (D) can be used to determine an effective pit depth 1106 at the vertex of the assumed parabola using the following equation:

$$H_{\it eff} = \sqrt{k\left(\frac{D}{2}\right)};$$

where k is a parameter measured from experimental data.

In some embodiments, the effective corrosion pit-depth 1106 can now be used as a failure parameter for further model fitting of the probability distribution function. Furthermore, the statistical modeling is not limited to the log-normal model technique. Multiple models can be utilized for each failure mode depending on the statistics of weak points relevant to pipe condition assessment.

According to certain aspects, embodiments provide a method for pipe condition estimation in a system (e.g., the system 100) comprising a processor (e.g., the processor 222). The method may include classifying (e.g., steps S703, S704) a pipe failure to a failure mode of a plurality of predetermined failure modes. The method may further include determining, by a processor based on the failure mode, a statistical model (e.g., step S706) representing a probability distribution of defect values per pipe length that lead to pipe failure. The method may further include translating, by the processor, failure parameters (e.g., step S705) to model parameters of the statistical model wherein the failure parameters relate to failure detection and repair of pipes. The method may further include fitting, by the processor, the statistical model to data of defect values using the model parameters (e.g., step S706).

According to some embodiments, the defect values are values of corrosion pit depth in metal pipes (e.g., corrosion pit depth 1106). The model parameters (e.g., the fit parameters) may include a corrosion pit depth in a pipe unit length and an average corrosion pit depth (e.g., average pit depth 1102). The failure parameters may include a pit hole diameter (e.g., leak diameter 1104). The statistical model may be a lognormal model (e.g., a lognormal distribution graph 800).

Figure 12:
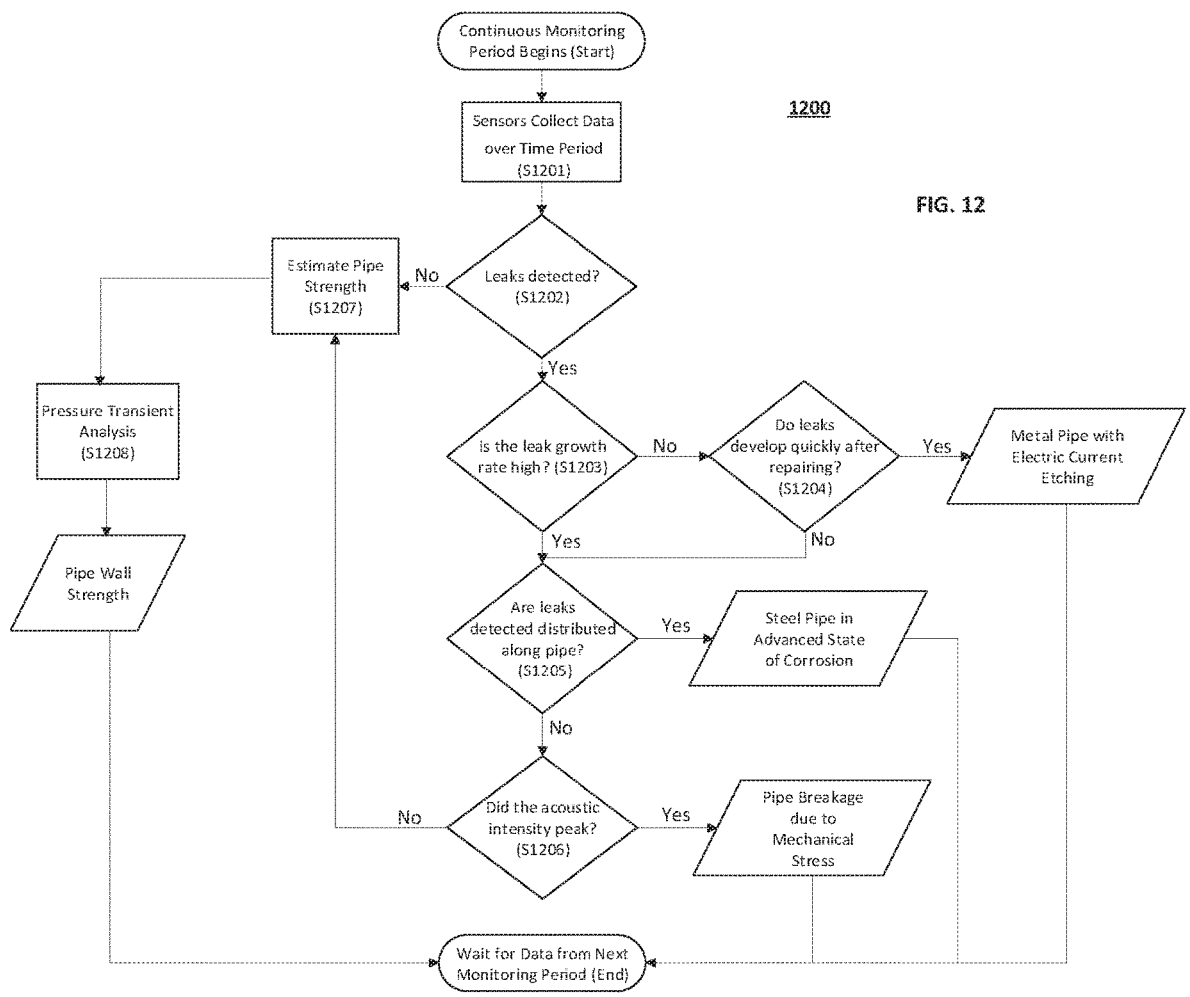
FIG. 12 is a flowchart illustrating a methodology for continuous pipe monitoring and condition assessment.

III. System and Method for Pipe Condition Assessment and Pipe Failure Classification FIG. 12 is a flowchart illustrating a method 1200 for continuous correlation pipe monitoring by a system 100 for generating a pipe condition assessment. According to some embodiments, the network part sensor layer 106 of the system 100 may be used for continuous monitoring over a period of time of a monitored pipe network part 104. The data gathered from the sensors can be processed by signal processing circuit 200 and processor 202, or any processor of the system 100. The method 1200 uses a combination of leak statistics, leak development dynamics and/or pressure transient analysis to determine the current condition of the monitored pipe network part 104.

In some embodiments, the data can contain (1) pressure measurements; (2) acoustic measurements including velocity, amplitude, wavelength, and energy (intensity) of acoustic waves; (3) flow rate; and/or (4) vibration measurements from the network part sensor layer 106 and are not limited to the scope of this disclosure. Additionally, larger diameter pipe network parts or sections may use hydrophone sensors for leak detection.

In some embodiments, the method 1200 begins upon installation of the continuous monitoring sensors and a step S1201 which determines a time period for data collection. The time period can be any length of time during which a sufficient amount of data may be collected for proper pipe condition analysis. The sensors collect pipe network parts data continuously during the time period, which may be stored in a pipe network parts database 122. The data collected over the time period is utilized by the processors to create a trend in leak development dynamics of the monitored pipe network 102 or the monitored pipe network part 104.

In some embodiments, a step S1202 analyzes the data gathered by network part sensor layer 106 to determine whether a leak is present in the monitored pipe network part 104. A leak may be detected by an anomaly in acoustic, pressure, flow rate, or vibration measurements. Step S1202 can be performed by the processor of failure detection and localization block 116 and/or the failure classification block 118. Step S1202 may include part characteristic data from the pipe network parts database 122 to further characterize the leak.

In some embodiments, upon determination that a leak exists in the monitored pipe network part 104, a step S1203 may determine if the leak growth rate is high. This determination may be performed by the processor of failure detection and localization block 116 and/or failure classification block 118. This determination may be a result of detecting significant changes in flow rate, pressure, or acoustic intensity, or any combination thereof.

In some embodiments, if the result of S1203 is the growth rate is not high, the method may progress to a step S1204, in which the system 100 determines whether the leaks develop quickly after repairing. This can be achieved by referencing the pipe network parts database 122, which contains historical records of part failures for any monitored pipe network part 104, and maintenance and repair records. The failure classification block 118 may determine from the timeline of failures and repairs the frequency at which leaks occur and the average time in the past a new leak takes to develop. If the leaks are determined to develop quickly after repair, the failure classification block 118 may issue a pipe condition assessment result detailing that the monitored pipe network part 104 is a metal pipe with electric current etching.

In some embodiments, S1204 may determine the leaks do not develop quickly after repairing, and will return to the main decision-making branch of the algorithm to proceed to a step S1205.

In some embodiments, step S1205 may determine whether the detected leaks are distributed along the pipe, which can be performed by the pipe failure and localization block 116 generating a failure alert and location 206. This determination may be performed in conjunction with the pipe network parts database 122 which may store a precise and/or general location of the monitored pipe network part 104. If the leaks are determined to be distributed along the pipe as opposed to focused in a precise area, the failure classification block 118 may issue a pipe condition assessment result detailing that the monitored pipe network part 104 is a steel pipe in an advanced state of corrosion.

In some embodiments, step S1205 may determine the leaks detected are focused in a particular section of the monitored pipe network part 104 (e.g., not distributed along the pipe). In the event of focused leak locations, the method proceeds to a step S1206 to determine whether the detected acoustic intensity reached a peak value, then proceeded to decrease. If the acoustic intensity detected by the acoustic sensors of the network part sensor layer 106 reached a peak followed by a gradual roll-off in intensity, the pipe classification failure block 118 may issue a pipe condition assessment result detailing that the monitored pipe network part 104 is a metal pipe with a breakage due to mechanical stress. However, if a steep drop in intensity occurs after a peak has been reached, the pipe classification failure block 118 may issue a pipe condition assessment result detailing that the monitored pipe network part 104 is a PVC or AC pipe with a breakage due to mechanical stress.

In the event no leaks were detected in step S1201 or the acoustic intensity did not peak in step S1206 in accordance with some embodiments, the algorithm for determining pipe condition proceeds to a step S1207: estimate pipe strength. In step S2107, the failure classification logic 224 and the pressure stress measuring logic 228 may be sent commands from processor 222 of failure classification block 118 (or other processor from any part of system 100) to calculate and determine an estimated pipe strength as a result of the pipe condition assessment.

According to some embodiments, a step S1208 performing a pressure transient analysis to estimate pipe wall strength and defects may occur. The system 100 may use synchronized recordings of pressure and hydrophone sensors to record pressure transients in the pipe. This may be achieved at the monitored pipe network part level in the processor 202, or another processor of the system 100. Pressure transients consist of localized wave fronts that travel through the pipe and can be reflected by changes in wall strength such as differences in wall thickness or elastic modulus. When detected by the combination of pressure sensors and hydrophone sensors, the processor 202 can analyze the pressure transient reflections within the pipe to estimate possible causes of the reflections and further estimate the cause or source of the reflection.

In some embodiments, the system 100 can further simulate a high frequency, low power pressure transient in a section of the pipe network for pipe condition assessment. As the specifics of the pressure transient (e.g., amplitude, intensity, etc.) are predetermined and the source is known, the pressure transient reflections may be detected more easily by the processor and the location of changes in wall thickness and/or elastic modulus may be more accurately located. The locations of these changes may be output directly as a pipe condition assessment result, or may undergo further analysis by the failure classification block 118 to determine a measure or summary of pipe condition as an assessment result.

Figure 13A:
FIG. 13A is a schematic view illustrating a steel pipe in an advanced stage of corrosion according to some embodiments.

FIG. 13A is a schematic view illustrating a steel pipe in an advanced stage of corrosion. According to some embodiments, leaks are distributed along the pipe in accordance with an affirmative result of determining step S1205. This result characterizes the pipe condition to be a steel pipe in an advanced state of corrosion, as the entirety of the pipe is failing.

Figure 13B:
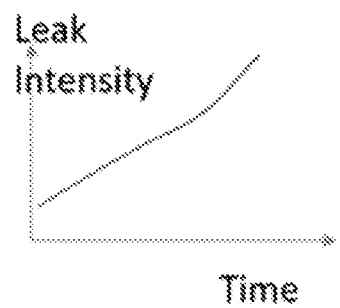
FIG. 13B is an exemplary leak intensity versus time curve illustrating a high leak growth rate as a result of a steel pipe in an advanced stage of corrosion.

FIG. 13B is an exemplary leak intensity versus time curve illustrating a high leak growth rate as a result of a steel pipe in an advanced stage of corrosion according to some embodiments. It can be seen that the growth leak rate continues to rise at a steep rate, in accordance with an affirmative result of determining step S1203.

Figure 14A:
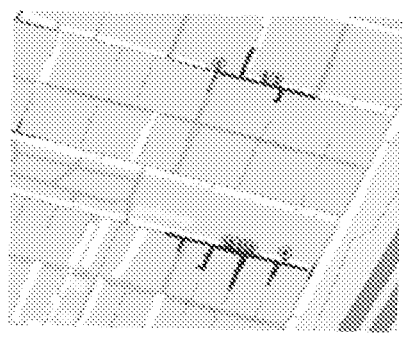
FIG. 14A is a schematic view illustrating a metal pipe affected by an electric current etching effect according to some embodiments.

FIG. 14A is a schematic view illustrating a metal pipe affected by an electric current etching effect. According to some embodiments, the leaks are localized in a precise location, and are further determined to develop quickly after repair in accordance with an affirmative result of step S1204. Thus, these leaks are determined to be the result of an electric current etching effect that eats away at the pipe wall.

Figure 14B:
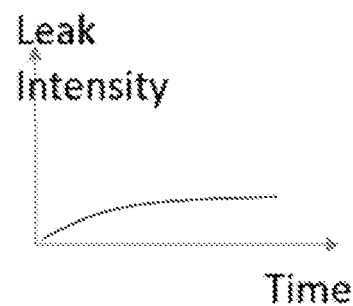
FIG. 14B is an exemplary leak intensity versus time curve illustrating a slow leak growth rate as a result of the electric current etching effect.

FIG. 14B is an exemplary leak intensity versus time curve illustrating a slow leak growth rate as a result of the electric current etching effect. According to some embodiments, the leak intensity will increase at a relatively slow rate, in accordance with a negative result of step S1203. Although there may be a leak in the pipe, a slow growth rate generally means that the pipe itself is still strong and in good condition, but an extraneous cause (e.g., electric current etching) results in leaks in a localized area of the pipe.

Figure 15A:
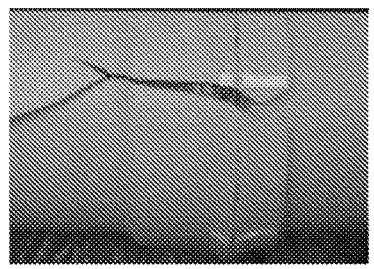
FIG. 15A is an exemplary illustration of a pipe breakage due to mechanical stress according to some embodiments.

FIG. 15A is an exemplary illustration of a pipe breakage due to mechanical stress. According to some embodiments, a pipe section or part may undergo mechanical stress such that a section of the pipe breaks, resulting in a leak and a need to replace the pipe section. In these situations, the acoustic intensity detected for the purpose of identifying these types of failures is a result of the pipe material.

Figure 15B:
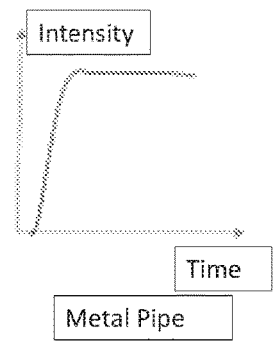
FIG. 15B is an exemplary leak intensity versus time curve illustrating a leak growth rate for a metal pipe as a result of breakage due to mechanical stress.

FIG. 15B is an exemplary leak intensity versus time curve illustrating a leak growth rate for a metal pipe as a result of breakage due to mechanical stress. According to some embodiments, a metal pipe may be monitored with acoustic sensors to detect failures. A mechanical stress event may occur that results in the breakage of the metal pipe. In response, the acoustic sensors will detect a sharp increase to a peak in acoustic intensity, followed by a gradual roll-off that is characteristic of a metal pipe break.

Figure 15C:
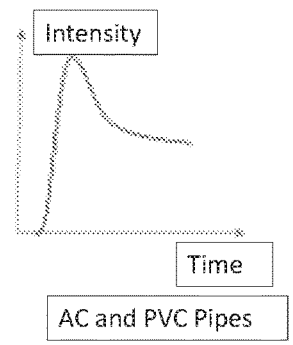
FIG. 15C is an exemplary leak intensity versus time curve illustrating a leak growth rate for a polyvinyl chloride (PVC) or asbestos-cement (AC) pipe as a result of breakage due to mechanical stress.

FIG. 15C is an exemplary leak intensity versus time curve illustrating a leak growth rate for a PVC or AC pipe as a result of breakage due to mechanical stress. According to some embodiments, a PVC or AC pipe may be monitored with acoustic sensors to detect failures. A mechanical stress event may occur that results in the breakage of the PVC or AC pipe. In response, the acoustic sensors will detect a sharp increase to a peak in acoustic intensity, followed by a sharp decrease as a result of pressure drop in the pipe that is characteristic of a PVC or AC pipe break.

According to certain aspects, embodiments provide a method for pipe condition assessment in a system (e.g., the system 100) comprising a processor (e.g., processor 222) and at least one sensor installed on a pipe. The method may include measuring leak data relating to a leak of the pipe (e.g., step S1201). The method may include estimating, based on the measured leak data, leak intensity of a pipe section of the pipe (e.g., S1202). The method may further include assessing, based on the estimated leak intensity, condition of the pipe section (e.g., steps S1204, S1205, S1206).

According to some embodiments, the method may further include estimating a plurality of values of leak intensity for a period of time (e.g., S1202). The method may include calculating, based on the plurality of values of leak intensity, a growth rate of the leak of the pipe (e.g., step S1203). The method may further include assessing, based on the calculated leak growth rate, condition of the pipe (e.g., steps S1204, S1205).

According to some embodiments, the at least one sensor comprises two acoustic sensors (e.g., sensors 301, 302). The method process of estimating the leak intensity of the pipe may include installing the two acoustic sensors in proximity to the pipe section such that a distance between the two acoustic sensors is a predetermined distance (e.g., diagram 300). The method may further include calculating an acoustic power by the two acoustic sensors (e.g., with chart 305). The method may further include calculating the leak intensity of the pipe section based on the acoustic power.

According to some embodiments, the method may further include calculating the acoustic power by measuring correlation and attenuation of acoustic signals in the pipe (e.g., step S1201) by measuring correlation and attenuation of acoustic signals in the pipe; and by calculating the acoustic power based on the measured correlation and attenuation of acoustic signals.

According to some embodiments, the at least one sensor may include a pressure sensor (e.g., pipe network part sensor layer 106), and the method may include measuring a differential pressure representing a difference between a water pressure in the pipe and a pressure outside the pipe (e.g., step S1201). The method may further include calculating a leak flow of the pipe section based on the acoustic power and the differential pressure (e.g., step 1208).

According to some embodiments, the method may further include measuring, by the at least one sensor, acoustic wave velocity data relating to strength of a pipe wall of the pipe (e.g., step S1201). The method may further include estimating a pipe strength (e.g., step S1207) of the pipe based on the measured acoustic wave velocity data. The method may further include assessing condition of the pipe section based on at least one of the estimated leak intensity or the estimated pipe strength.

According to some embodiments, the method may include measuring, by the at least one sensor, pressure transients in the pipe (e.g., step S1201). The method may further include estimating changes in pipe wall strength of the pipe (e.g., step 1208). The method may further include assessing condition of the pipe section based on at least one of the estimated leak intensity or the estimated changes in pipe wall strength.

According to some embodiments, the pressure transients include localized wave fronts that travel through the pipe.

According to some embodiments, the method may further include analyzing reflections of the pressure transients by changes in wall thickness and elastic modulus (e.g., step 1208). The method may further include estimating, by the processor based on a result of the analysis, the changes in pipe wall strength.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for pipe condition assessment in a system comprising a processor and at least one sensor installed on a pipe, said method comprising:
    measuring, by the at least one sensor, leak data relating to a leak of the pipe, and
    estimating, by the processor based on the measured leak data, leak intensity of a pipe section of the pipe;
    assessing, by the processor based on the estimated leak intensity, condition of the pipe section;
    measuring, by the at least one sensor, acoustic wave velocity data relating to strength of a pipe wall of the pipe;
    estimating, by the processor, a pipe strength of the pipe based on the measured acoustic wave velocity data; and
    assessing, by the processor, condition of the pipe section based on at least one of the estimated leak intensity or the estimated pipe strength.

2. The method according to claim 1, further comprising:
    estimating, by the processor, a plurality of values of leak intensity for a period of time;
    calculating, by the processor based on the plurality of values of leak intensity, a growth rate of the leak of the pipe; and
    assessing, by the processor based on the calculated leak growth rate, condition of the pipe.

3. The method according to claim 1, wherein
    the at least one sensor comprises two acoustic sensors, and
    the estimating leak intensity of the pipe section comprises:
        installing the two acoustic sensors in proximity to the pipe section such that a distance between two acoustic sensors is a predetermined distance;
        calculating an acoustic power by the two acoustic sensors; and
        calculating the leak intensity of the pipe section based on the acoustic power.

4. The method according to claim 3, wherein the calculating an acoustic power comprises:
    measuring, by the two acoustic sensors, correlation and attenuation of acoustic signals in the pipe; and
    calculating, by the two acoustic sensors, the acoustic power based on the measured correlation and attenuation of acoustic signals.

5. The method according to claim 3, wherein
    the at least one sensor further comprises a pressure sensor, and
    the method further comprises:

measuring, by the pressure sensor, a differential pressure representing a difference between a water pressure in the pipe and a pressure outside the pipe; and calculating a leak flow of the pipe section based on the acoustic power and the differential pressure.

6. The method according to claim 1, further comprising:
measuring, by the at least one sensor, pressure transients in the pipe;
estimating, by the processor, changes in pipe wall strength of the pipe; and
assessing, by the processor, condition of the pipe section based on at least one of the estimated leak intensity or the estimated changes in pipe wall strength.

7. The method according to claim 6, wherein the pressure transients include localized wave fronts that travel through the pipe.

8. The method according to claim 7, further comprising:
analyzing, by the processor, reflection of the pressure transients by changes in wall thickness and elastic modulus; and
estimating, by the processor based on a result of the analysis, the changes in pipe wall strength.

9. The method according to claim 4, wherein
the acoustic power released by a leak jet of the leak is calculated from the following formula:

$$\text{Jet Power}\left[N \times \frac{m}{s}\right] = \text{Flow}\left[\frac{m^3}{s}\right] \times \text{Pressure}\left[\frac{n}{m^2}\right],$$

a fraction of the calculated jet power is converted to the acoustic power that travels over the pipes to the at least one sensor, and
a conversion ratio depends on factors including the shape of the leak, that influence a jet velocity.

10. The method according to claim 4, wherein
acoustic vibrations from the leak propagate to the at least one sensors along the pipe and are represented by a first attenuation coefficient,
the acoustic power is estimated using a pipe attenuation model in which a second attenuation coefficient is defined over the pipe according to a pipe material or additional pipe characteristics, and
the model is calibrated by measuring a attenuation coefficient for corresponding pipes.

11. The method according to claim 4, wherein
the acoustic power is calculated by a function f, which factors in both sensors signal correlation intensity and a signal attenuation in the pipe, using the following formula:

Acoustic Power $P_a$=f(correlation intensity,attenuation).

12. The method according to claim 5, wherein the leak flow of the pipe section is calculated based on the acoustic power and the differential pressure using a conversion factor from the following formula:

Leak Flow=Acoustic Power÷(Conversion Factor× Pressure).

13. The method according to claim 1, wherein the leak data comprises at least one of (1) pressure measurements; (2) acoustic measurements including velocity, amplitude, wavelength, energy of acoustic waves, or intensity of acoustic waves; (3) flow rate; or (4) vibration measurements from the at least one sensor.

14. The method according to claim 1, wherein the at least one sensor includes hydrophone sensors for larger diameter pipe network parts or sections.

15. The method according to claim 1, further comprising:
determining a time period for data collection, wherein the time period has a length of time during which an amount of data are continuously collected for pipe condition analysis;
storing the amount of data in a pipe network parts database to create a trend in leak development dynamics of a monitored pipe network or a monitored pipe network part;
upon determination that a leak exists in the monitored pipe network part, determining if the leak growth rate is high; and
detecting, based on a result of determining if the leak growth rate is high, changes in flow rate, pressure, or acoustic intensity, or any combination thereof.

16. The method according to claim 15, further comprising:
determining, based on a result of determining if the leak growth rate is high, if the leak develops quickly after repair; and
determining, in response to determining that the leak develops quickly after repair, that the leak occurs as a result of an electric current etching effect that eats away at a pipe wall.

17. The method according to claim 1, further comprising:
determining if the leak intensity reaches a peak followed by a gradual roll-off in intensity;
issuing, based on determining if the leak intensity reaches the peak, a pipe condition assessment result indicating that a monitored pipe network part is a metal pipe with a breakage due to mechanical stress;
determining if a steep drop in intensity occurs after a peak has been reached; and
issuing, based on determining that the steep drop in intensity occurs after the peak has been reached, a pipe condition assessment result indicating that the monitored pipe network part is a polyvinyl chloride (PVC) or asbestos-cement (AC) pipe with a breakage due to mechanical stress.

18. The method according to claim 17, further comprising: identifying, as a cause of the leak based on the leak intensity, the breakage due to mechanical stress such that a section of the pipe breaks due to mechanical stress exerted on a pipe material.

19. The method according to claim 18, wherein the breakage due to mechanical stress is identified by detecting a sharp increase to a peak in the leak intensity, followed by a sharp decrease as a result of pressure drop in the pipe which is a PVC pipe or AC pipe.

20. A system for pipe network failure classification, said system comprising:
one or more sensors deployed in, on or in proximity to at least one pipe of a pipe network, for monitoring a pipe operation condition and collecting related sensor parameter values; and,
at least one processor, communicatively networked to said one or more sensors and to a pipe network parts database, said pipe network parts database storing feature parameter value records of pipes in the pipe network, said at least one processor is configured to:
(i) intermittently receive the sensor parameters values from said one or more sensors, the sensors parameter values may be an indication of a failure of the at least one pipe;

(ii) reference, upon receipt of an indication of a failure of the at least one pipe the records stored in the pipe network parts database;

(iii) retrieve one or more feature parameter value records of the at least one pipe; and (iv) classify the failure of the at least one pipe into one of two or more failure categories associated with different failure causes, based on the sensor parameter values or the retrieved one or more feature parameter value records of the at least one pipe, a failure history database storing records of failure history, wherein said at least one processor is further configured to reference the records of failure history to retrieve one or more prior failure parameter values associated with the at least one pipe, and classify the failure of the at least one pipe into one of two or more failure categories associated with different failure causes, based on the retrieved one or more prior failure parameter values.

21. The system according to claim 20, wherein at least one of the following (a), (b), or (c) is satisfied:
    (a) said one or more sensors include one or more acoustic sensors, and said at least one processor is configured to detect a leak and estimate an intensity and an intensity growth rate of the leak, based on the sensor parameter values collected by the one or more acoustic sensors;
    (b) said one or more sensors include one or more pressure sensors, and said at least one processor is configured to detect and correlate pressure changes and pressure surges with an appearance and a growth rate of the failure;
    (c) said one or more sensors include one or more pressure sensors, and said at least one processor is configured to estimate a condition of the at least one pipe, based on calculation of a pressure stress exerted on the at least one pipe using corresponding sensor parameter values collected by said one or more pressure sensors.

22. The system according to claim 21,
    wherein said one or more pressure sensors are configured to collect related pressure transient parameter values that include at least pressure transient magnitudes and a number of oscillations over a time period, and
    wherein said at least one processor is configured to calculate a probability of a related pressure transient failure in the pipe network or a specific section thereof, using a pipe stress factor calculation scheme factoring the at least pressure transient magnitudes and the number of oscillations.

23. The system according to claim 20, wherein said at least one processor is configured to select for recommendation one or more remediation solutions or tasks matching a failure category into which the failure of the at least one pipe is classified.

24. The system according to claim 20, wherein said at least one processor is further configured to:
    upon receipt of request for an assessment of a specific section of the pipe network, reference classification results records of one or more failure classifications made by said at least one processor and retrieve a specific record corresponding to the specific section, and
    assess a condition of specific section, based on the specific record.

25. The system according to claim 20, wherein the records of failure history include a database of prior leak parameter records, the database of prior leak parameter records comprising at least one of (1) location of leak in the pipe network; (2) leaking pipe section details of pipes with leak; (3) leak growth rate of leak over time; (4) leak size at a time of repair; (5) leak type selected from crack, hole, or corrosion; or (6) other leak related data.

26. The system according to claim 20, wherein said pipe network parts database stores:
    (1) historic records of leaks labeled by failure type including corrosion, ground movement, or leak location; and
    (2) attributes of the at least one pipe including at least one of material, diameter, year of installation, working pressure, pressure transients, temperature changes, wall thickness, ground corrosiveness, ground conductivity, or copper pipe connection density per unit length.

27. A method for pipe network failure classification, said method comprising:
    monitoring operation conditions of at least one pipe of a pipe network and logging related operation parameter values collected by one or more sensors deployed in, on or in proximity to the at least one pipe of the pipe network, the operation parameter values may be an indication of a failure of the at least one pipe;
    monitoring environment conditions of the at least one pipe and collecting related environment parameter values;
    intermittently receiving the operation parameter values collected by the one or more sensors;
    receiving an indication of a failure of the at least one pipe, or learning of a failure in the pipe network of the at least one pipe by accessing a pipe network failures database that stores records of related operation parameter values collected by the one or more sensors and finding an indication of a failure of the at least one pipe;
    referencing, upon receipt or finding the indication of the failure of the at least one pipe, records of a pipe network parts database that stores feature parameter value records of pipes in the pipe network;
    retrieving one or more feature parameter values records associated with the at least one pipe; and
    classifying the failure of the at least one pipe into one of two or more failure categories associated with different failure causes, based on at least one collected operation parameters values, one collected environment parameters values and one retrieved feature parameter value records
    referencing records of a failure history database that stores failure parameter value records of prior failure pipes in the pipe network; and
    retrieving one or more failure parameter value records associated with the at least one pipe,
    wherein classifying the failure of the at least one pipe is based on at least one the retrieved failure parameter value records.

28. The method according to claim 27, wherein at least one of the following
    (a), (b), or (c) is satisfied:
    (a) monitoring operation conditions of the at least one pipe of the pipe network and logging related operation parameter values includes monitoring acoustic conditions of the at least one pipe and collecting related acoustic parameter values collected by one or more acoustic sensors, wherein said method further comprises detecting a leak in the at least one pipe and estimating an intensity and an intensity growth rate of the leak, based on the collected acoustic parameter values;

(b) said method additionally comprises (1) monitoring pressure conditions of the at least one pipe and collecting related pressure parameter values collected by one or more pressure sensors and (2) correlating pressure changes and pressure surges as expressed in pressure parameter values collected over time, with known pipe failure appearances and growth rate schemes;

(c) said method additionally comprises (1) calculating a pressure stress exerted on the at least one pipe, using the pressure parameter values collected by one or more pressure sensors and (2) estimating a condition of at the least one pipe based on the calculated pressure stress exerted on the at least one pipe.

29. The method according to claim 28, further comprising:
collecting related pressure transient parameter values includes at least pressure transient magnitudes and a number of oscillations over a time period; and
calculating a probability of a related pressure transient failure in the pipe network or a specific section thereof, using a pipe stress factor calculation scheme factoring the at least pressure transient magnitudes and the number of oscillations.

30. The method according to claim 27, further comprising:
selecting for recommendation one or more remediation solutions or tasks matching a failure category into which the failure of the at least one pipe is classified.

31. The method according to claim 27, wherein the records of a failures history include a prior leak parameter records, the prior leak parameter records comprising at least one of (1) location of leak in the pipe network; (2) details of pipes with leak; (3) leak growth rate over time; (4) leak size at a time of repair; (5) leak type selected from crack, hole, or corrosion; or (6) other leak related data.

32. The method according to claim 27, wherein said pipe network parts database stores: (1) historic records of leaks labeled by failure type including corrosion, ground movement, or leak location; and (2) attributes of the at last one pipe including at least one of material, diameter, year of installation, working pressure, pressure transients, temperature changes, wall thickness, ground corrosiveness, ground conductivity, or copper pipe connection density per unit length.

33. A system for pipe network failure classification, said system comprising:
one or more sensors deployed in, on or in proximity to at least one pipe of a pipe network, for monitoring a pipe operation condition and collecting related sensor parameter values; and,
at least one processor, communicatively networked to said one or more sensors and to a pipe network parts database, said pipe network parts database storing feature parameter value records of pipes in the pipe network, said at least one processor is configured to:
(i) intermittently receive the sensor parameter values from said one or more sensors, the sensors parameter values may be an indication of a failure of the at least one pipe;
(ii) reference, upon receipt of an indication of a failure of the at least one pipe, the records stored in the pipe network parts database;
(iii) retrieve one or more feature parameter value records of the at least one pipe; and
(iv) classify the failure of the at least one pipe into one of two or more failure categories associated with different failure causes, based on the sensor parameter values or the retrieved one or more feature parameter value records of the at least one pipe, wherein said pipe network parts database stores:
(1) historic records of leaks labeled by failure type including corrosion, ground movement, or leak location; and
(2) attributes of the at least one pipe including at least one of material, diameter, year of installation, working pressure, pressure transients, temperature changes, wall thickness, ground corrosiveness, ground conductivity, or copper pipe connection density per unit length.

34. The system according to claim 33, further comprising a failure history database storing records of failure history, wherein said at least one processor is further configured to
reference the records of failure history to retrieve one or more prior failure parameter values associated with the at least one pipe, and
classify the failure of the at least one pipe into one of two or more failure categories associated with different failure causes, based on the retrieved one or more prior failure parameter values.

35. The system according to claim 33, wherein at least one of the following (a), (b), or (c) is satisfied:
(a) said one or more sensors include one or more acoustic sensors, and said at least one processor is configured to detect a leak and estimate an intensity and an intensity growth rate of the leak, based on the sensor parameter values collected by the one or more acoustic sensors;
(b) said one or more sensors include one or more pressure sensors, and said at least one processor is configured to detect and correlate pressure changes and pressure surges with an appearance and a growth rate of the failure;
(c) said one or more sensors include one or more pressure sensors, and said at least one processor is configured to estimate a condition of the at least one pipe, based on calculation of a pressure stress exerted on the at least one pipe using corresponding sensor parameter values collected by said one or more pressure sensors.

36. The system according to claim 35,
wherein said one or more pressure sensors are configured to collect related pressure transient parameter values that include at least pressure transient magnitudes and a number of oscillations over a time period, and
wherein said at least one processor is configured to calculate a probability of a related pressure transient failure in the pipe network or a specific section thereof, using a pipe stress factor calculation scheme factoring the at least pressure transient magnitudes and the number of oscillations.

37. The system according to claim 33, wherein said at least one processor is configured to select for recommendation one or more remediation solutions or tasks matching a failure category into which the failure of the at least one pipe is classified.

38. The system according to claim 33, wherein said at least one processor is further configured to:
upon receipt of request for an assessment of a specific section of the pipe network, reference classification results records of one or more failure classifications made by said at least one processor and retrieve a specific record corresponding to the specific section, and
assess a condition of specific section, based on the specific record.

39. The system according to claim 34, wherein the records of failure history include a database of prior leak parameter records, the database of prior leak parameter records comprising at least one of (1) location of leak in the pipe network; (2) details of pipes with leak; (3) leak growth rate over time; (4) leak size at a time of repair; (5) leak type selected from crack, hole, or corrosion; or (6) other leak related data.

40. A method for pipe network failure classification, said method comprising:
  monitoring operation conditions of at least one pipe of a pipe network and logging related operation parameter values collected by one or more sensors deployed in, on or in proximity to the at least one pipe of the pipe network, the operation parameter values may be an indication of a failure of the at least one pipe;
  monitoring environment conditions of the at least one pipe and collecting related environment parameter values;
  intermittently receiving the operation parameter values collected by the one or more sensors;
  receiving an indication of a failure of the at least one pipe, or learning of a failure in the pipe network of the at least one pipe by accessing a pipe network failures database that stores records of related operation parameter values collected by the one or more sensors and finding an indication of a failure of the at least one pipe;
  referencing, upon receipt or finding the indication of the failure of the at least one pipe, records of a pipe network parts database that stores feature parameter value records of pipes in the pipe network;
  retrieving one or more feature parameter value records associated with the at least one pipe; and
  classifying the failure of the at least one pipe into one of two or more failure categories associated with different failure causes, based on at least one collected operation parameter values, one collected environment parameter values and one retrieved feature parameter value records
  wherein said pipe network parts database stores: (1) historic records of leaks labeled by failure type including corrosion, ground movement, or leak location; and (2) attributes of the at last one pipe including at least one of material, diameter, year of installation, working pressure, pressure transients, temperature changes, wall thickness, ground corrosiveness, ground conductivity, or copper pipe connection density per unit length.

41. The method according to claim 40, further comprising:
  referencing records of a failure history database that stores failure parameter value records of prior failure pipes in the pipe network; and
  retrieving one or more failure parameter values records associated with the at least one pipe,
  wherein classifying the failure of the at least one pipe is based on at least one the retrieved failure parameter value records.

42. The method according to claim 40, wherein at least one of the following
  (a), (b), or (c) is satisfied:
  (a) monitoring operation conditions of the at least one pipe network and logging related operation parameter values include monitoring acoustic conditions of the at least one pipe and collecting related acoustic parameter values collected by one or more acoustic sensors, wherein said method further comprises detecting a leak in the at least one pipe and estimating an intensity and an intensity growth rate of the leak, based on the collected acoustic parameter values;
  (b) said method additionally comprises (1) monitoring pressure conditions of the at least one pipe and collecting related pressure parameter values collected by one or more pressure sensors and (2) correlating pressure changes and pressure surges as expressed in pressure parameter values collected over time, with known pipe failure appearances and growth rate schemes;
  (c) said method additionally comprises (1) calculating a pressure stress exerted on the at least one pipe, using the pressure parameter values collected by one or more pressure sensors and (2) estimating a condition of at the least one pipe based on the calculated pressure stress exerted on the at least one pipe.

43. The method according to claim 40, further comprising:
  collecting related pressure transient parameter values includes at least pressure transient magnitudes and a number of oscillations over a time period; and
  calculating a probability of a related pressure transient failure in the pipe network or a specific section thereof, using a pipe stress factor calculation scheme factoring the at least pressure transient magnitudes and the number of oscillations.

44. The method according to claim 40, further comprising:
  selecting for recommendation one or more remediation solutions or tasks matching a failure category into which the failure of the at least one pipe is classified.

45. The method according to claim 41, wherein the records of a failure history include a prior leak parameter records, the prior leak parameter records comprising at least one of (1) location of leak in the pipe network; (2) details of pipes with leak; (3) leak growth rate over time; (4) leak size at a time of repair; (5) leak type selected from crack, hole, or corrosion; or (6) other leak related data.

* * * * *